(12) United States Patent
Yabuta

(10) Patent No.: US 8,982,165 B2
(45) Date of Patent: Mar. 17, 2015

(54) ILLUMINATION DEVICE AND DISPLAY DEVICE INCLUDING THE SAME

(75) Inventor: Junko Yabuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 184 days.

(21) Appl. No.: 13/570,707

(22) Filed: Aug. 9, 2012

(65) Prior Publication Data

US 2013/0038212 A1    Feb. 14, 2013

(30) Foreign Application Priority Data

Aug. 11, 2011 (JP) .............................. JP2011-175915
Jul. 13, 2012 (JP) .............................. JP2012-157990

(51) Int. Cl.
  G09G 5/10      (2006.01)
  G02F 1/1335    (2006.01)
  H05B 33/08     (2006.01)

(52) U.S. Cl.
  CPC .... *G02F 1/133603* (2013.01); *G02F 1/133611* (2013.01); *H05B 33/086* (2013.01); *G02F 2001/133601* (2013.01); *H05B 33/0866* (2013.01); *H05B 33/0872* (2013.01)
  USPC ........... 345/690; 345/207; 345/204; 345/205; 315/113

(58) Field of Classification Search
  USPC .................. 315/113; 345/102, 204, 207, 690
  See application file for complete search history.

(56) References Cited

U.S. PATENT DOCUMENTS

| 8,350,789 B2 * | 1/2013 | Furuya et al. .................... 345/84 |
| 8,599,301 B2 * | 12/2013 | Dowski et al. ................ 348/340 |
| 2006/0022616 A1 * | 2/2006 | Furukawa et al. ............ 315/309 |
| 2007/0221943 A1 | 9/2007 | Moriya et al. |
| 2009/0003250 A1 | 1/2009 | Matsumura |
| 2009/0021471 A1 | 1/2009 | Park et al. |
| 2009/0103283 A1 | 4/2009 | Baba |
| 2009/0284506 A1 * | 11/2009 | Chikaoka et al. .............. 345/207 |
| 2009/0306509 A1 * | 12/2009 | Pedersen et al. .............. 600/446 |
| 2009/0310091 A1 | 12/2009 | Nozaki et al. |
| 2010/0052564 A1 | 3/2010 | Park et al. |
| 2010/0188324 A1 * | 7/2010 | Ohashi et al. .................. 345/102 |
| 2010/0265228 A1 * | 10/2010 | Kimura et al. ................. 345/207 |
| 2011/0069094 A1 * | 3/2011 | Knapp .......................... 345/690 |
| 2011/0149319 A1 * | 6/2011 | Muto et al. ..................... 358/1.9 |
| 2011/0157244 A1 * | 6/2011 | Nakano et al. ................ 345/690 |
| 2011/0175895 A1 * | 7/2011 | Hayakawa et al. ........... 345/212 |

(Continued)

FOREIGN PATENT DOCUMENTS

| CN | 101006709 A | 7/2007 |
| JP | 2000-194337 A | 7/2000 |

(Continued)

*Primary Examiner* — Thuy Vinh Tran
*Assistant Examiner* — Syed M Kaiser
(74) *Attorney, Agent, or Firm* — Keating & Bennett, LLP

(57) ABSTRACT

An illumination device includes a light source in which a plurality of light emitting elements are arranged, a luminous intensity controller configured to control luminous intensities of the plurality of light emitting elements separately in groups of one or more light emitting elements, and a predetermined correction table indicating temperature distribution characteristics corresponding to position information of the plurality of light emitting elements in the light source. The luminous intensity controller controls the luminous intensities of the plurality of light emitting elements corresponding to the position information based on the temperature distribution characteristics of the correction table.

7 Claims, 29 Drawing Sheets

(56) References Cited

U.S. PATENT DOCUMENTS

| | | | |
|---|---|---|---|
| 2011/0205450 A1* | 8/2011 | Mouri | 348/739 |
| 2011/0273904 A1* | 11/2011 | Tajiri et al. | 362/606 |
| 2011/0273906 A1* | 11/2011 | Nichol et al. | 362/607 |
| 2011/0309755 A1* | 12/2011 | Wirth et al. | 315/151 |
| 2012/0019164 A1* | 1/2012 | Gambeski et al. | 315/294 |
| 2013/0038212 A1* | 2/2013 | Yabuta | 315/113 |

FOREIGN PATENT DOCUMENTS

| | | |
|---|---|---|
| JP | 2006-031977 A | 2/2006 |
| JP | 2006-147373 A | 6/2006 |
| JP | 2009-016913 A | 1/2009 |
| JP | 2009-117348 A | 5/2009 |
| JP | 2009-528566 A | 8/2009 |
| JP | 2010-055053 A | 3/2010 |

* cited by examiner

FIG.7

| α(i,j) 20 | | 20a | | | 20c | | | | | | | | | 70 |
|---|---|---|---|---|---|---|---|---|---|---|---|---|---|---|
| 1,1 | 2,1 | 3,1 | 4,1 | 5,1 | 6,1 | 7,1 | 8,1 | 9,1 | 10,1 | 11,1 | 12,1 | 13,1 | 14,1 | 15,1 | 16,1 |
| 1,2 | 2,2 | 3,2 | 4,2 | 5,2 | 6,2 | 7,2 | 8,2 | 9,2 | 10,2 | 11,2 | 12,2 | 13,2 | 14,2 | 15,2 | 16,2 |
| 1,3 | 2,3 | 3,3 | 4,3 | 5,3 | 6,3 | 7,3 | 8,3 | 9,3 | 10,3 | 11,3 | 12,3 | 13,3 | 14,3 | 15,3 | 16,3 |
| 1,4 | 2,4 | 3,4 | 4,4 | 5,4 | 6,4 | 7,4 | 8,4 | 9,4 | 10,4 | 11,4 | 12,4 | 13,4 | 14,4 | 15,4 | 16,4 |
| 1,5 | 2,5 | 3,5 | 4,5 | 5,5 | 6,5 | 7,5 | 8,5 | 9,5 | 10,5 | 11,5 | 12,5 | 13,5 | 14,5 | 15,5 | 16,5 |
| 1,6 | 2,6 | 3,6 | 4,6 | 5,6 | 6,6 | 7,6 | 8,6 | 9,6 | 10,6 | 11,6 | 12,6 | 13,6 | 14,6 | 15,6 | 16,6 |
| 1,7 | 2,7 | 3,7 | 4,7 | 5,7 | 6,7 | 7,7 | 8,7 | 9,7 | 10,7 | 11,7 | 12,7 | 13,7 | 14,7 | 15,7 | 16,7 |
| 1,8 | 2,8 | 3,8 | 4,8 | 5,8 | 6,8 | 7,8 | 8,8 | 9,8 | 10,8 | 11,8 | 12,8 | 13,8 | 14,8 | 15,8 | 16,8 |
| 1,9 | 2,9 | 3,9 | 4,9 | 5,9 | 6,9 | 7,9 | 8,9 | 9,9 | 10,9 | 11,9 | 12,9 | 13,9 | 14,9 | 15,9 | 16,9 |
| 1,10 | 2,10 | 3,10 | 4,10 | 5,10 | 6,10 | 7,10 | 8,10 | 9,10 | 10,10 | 11,10 | 12,10 | 13,10 | 14,10 | 15,10 | 16,10 |
| 1,11 | 2,11 | 3,11 | 4,11 | 5,11 | 6,11 | 7,11 | 8,11 | 9,11 | 10,11 | 11,11 | 12,11 | 13,11 | 14,11 | 15,11 | 16,11 |
| 1,12 | 2,12 | 3,12 | 4,12 | 5,12 | 6,12 | 7,12 | 8,12 | 9,12 | 10,12 | 11,12 | 12,12 | 13,12 | 14,12 | 15,12 | 16,12 |

FIG.10

| j \ i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 41 | 42 | 41 | 39 | 38 | 42 | 44 | 45 | 43 | 42 | 40 | 38 | 37 | 39 | 40 | 38 |
| 2 | 40 | 41 | 41 | 39 | 39 | 42 | 43 | 45 | 43 | 42 | 41 | 38 | 37 | 39 | 40 | 38 |
| 3 | 39 | 40 | 42 | 38 | 38 | 44 | 44 | 44 | 44 | 42 | 42 | 38 | 37 | 40 | 40 | 38 |
| 4 | 38 | 40 | 42 | 38 | 38 | 43 | 43 | 45 | 44 | 42 | 42 | 38 | 38 | 40 | 40 | 37 |
| 5 | 38 | 39 | 41 | 38 | 38 | 42 | 43 | 44 | 43 | 42 | 41 | 38 | 38 | 41 | 39 | 36 |
| 6 | 37 | 38 | 40 | 37 | 37 | 41 | 44 | 43 | 42 | 41 | 42 | 37 | 37 | 41 | 40 | 36 |
| 7 | 37 | 37 | 39 | 36 | 36 | 41 | 43 | 42 | 42 | 40 | 41 | 36 | 36 | 40 | 39 | 36 |
| 8 | 36 | 36 | 38 | 36 | 36 | 40 | 41 | 41 | 41 | 39 | 40 | 36 | 36 | 39 | 38 | 36 |
| 9 | 36 | 36 | 37 | 35 | 36 | 40 | 40 | 40 | 40 | 38 | 39 | 37 | 36 | 38 | 37 | 35 |
| 10 | 36 | 36 | 37 | 35 | 35 | 39 | 39 | 39 | 39 | 37 | 37 | 36 | 36 | 38 | 36 | 35 |
| 11 | 35 | 36 | 36 | 35 | 35 | 38 | 37 | 38 | 38 | 38 | 38 | 36 | 35 | 37 | 35 | 34 |
| 12 | 34 | 35 | 36 | 34 | 35 | 36 | 37 | 37 | 37 | 37 | 36 | 35 | 34 | 36 | 35 | 34 |

| temperature setting [°C] | 34 | 35 | 36 | 37 | 38 | 39 | 40 | 41 | 42 | 43 | 44 | 45 |
|---|---|---|---|---|---|---|---|---|---|---|---|---|
| current magnification factor where highest temperature setting is a reference | 0.916 | 0.924 | 0.931 | 0.939 | 0.947 | 0.954 | 0.962 | 0.969 | 0.977 | 0.985 | 0.992 | 1 |

| temperature setting [°C] | 34 | 35 | 36 | 37 | 38 | 39 | 40 | 41 | 42 | 43 | 44 | 45 |
|---|---|---|---|---|---|---|---|---|---|---|---|---|
| current magnification factor where intermediate temperature setting is a reference | 0.960 | 0.968 | 0.976 | 0.984 | 0.992 | 1 | 1.008 | 1.016 | 1.024 | 1.032 | 1.040 | 1.048 |

| j\i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 41 | 42 | 41 | 39 | 38 | 42 | 44 | 45 | 43 | 42 | 40 | 38 | 37 | 39 | 40 | 38 |
| 2 | 40 | 41 | 41 | 39 | 39 | 42 | 43 | 45 | 43 | 42 | 41 | 38 | 37 | 39 | 40 | 38 |
| 3 | 39 | 40 | 42 | 38 | 38 | 44 | 44 | 44 | 44 | 42 | 42 | 38 | 37 | 40 | 40 | 38 |
| 4 | 38 | 40 | 42 | 38 | 38 | 43 | 43 | 45 | 44 | 42 | 42 | 38 | 38 | 40 | 40 | 37 |
| 5 | 38 | 39 | 41 | 38 | 38 | 42 | 43 | 44 | 43 | 42 | 41 | 38 | 38 | 41 | 39 | 36 |
| 6 | 37 | 38 | 40 | 37 | 37 | 36 | 39 | 38 | 37 | 36 | 37 | 37 | 37 | 41 | 40 | 36 |
| 7 | 37 | 37 | 39 | 36 | 36 | 36 | 38 | 37 | 37 | 35 | 36 | 36 | 36 | 40 | 39 | 36 |
| 8 | 36 | 36 | 38 | 36 | 36 | 43 | 45 | 44 | 44 | 42 | 43 | 36 | 36 | 39 | 38 | 36 |
| 9 | 36 | 36 | 37 | 35 | 35 | 39 | 40 | 43 | 43 | 41 | 42 | 37 | 36 | 38 | 37 | 35 |
| 10 | 36 | 36 | 37 | 35 | 35 | 38 | 39 | 39 | 39 | 37 | 37 | 36 | 36 | 38 | 38 | 35 |
| 11 | 35 | 35 | 36 | 34 | 35 | 38 | 37 | 38 | 38 | 38 | 38 | 36 | 35 | 37 | 37 | 34 |
| 12 | 34 | 35 | 36 | 34 | 35 | 36 | 37 | 37 | 37 | 37 | 36 | 35 | 34 | 36 | 35 | 34 |

(top) (right) (bottom) (left)

FIG.23

| i\j | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 43 | 42 | 41 | 36 | 36 | 42 | 41 | 40 | 39 | 39 | 38 | 36 | 36 | 39 | 38 | 36 |
| 2 | 44 | 43 | 41 | 37 | 37 | 42 | 41 | 40 | 39 | 39 | 38 | 36 | 36 | 39 | 38 | 37 |
| 3 | 43 | 42 | 42 | 36 | 36 | 42 | 41 | 39 | 38 | 38 | 38 | 37 | 36 | 40 | 38 | 36 |
| 4 | 44 | 43 | 42 | 36 | 36 | 41 | 40 | 39 | 40 | 38 | 38 | 37 | 36 | 40 | 38 | 37 |
| 5 | 45 | 44 | 41 | 36 | 36 | 42 | 40 | 39 | 39 | 39 | 38 | 36 | 37 | 41 | 37 | 36 |
| 6 | 45 | 44 | 42 | 36 | 36 | 37 | 37 | 37 | 36 | 35 | 36 | 37 | 37 | 41 | 38 | 36 |
| 7 | 44 | 43 | 42 | 37 | 37 | 37 | 37 | 36 | 37 | 35 | 36 | 37 | 36 | 40 | 37 | 36 |
| 8 | 45 | 43 | 41 | 36 | 36 | 42 | 41 | 40 | 40 | 39 | 38 | 36 | 36 | 40 | 38 | 36 |
| 9 | 43 | 42 | 41 | 36 | 36 | 42 | 41 | 39 | 39 | 38 | 38 | 36 | 36 | 39 | 38 | 36 |
| 10 | 43 | 42 | 41 | 37 | 37 | 41 | 40 | 39 | 40 | 40 | 39 | 37 | 36 | 39 | 37 | 35 |
| 11 | 43 | 41 | 40 | 36 | 36 | 40 | 39 | 39 | 39 | 39 | 38 | 36 | 36 | 40 | 36 | 36 |
| 12 | 42 | 41 | 40 | 36 | 36 | 40 | 39 | 39 | 39 | 39 | 38 | 36 | 36 | 39 | 36 | 35 |

| j \ i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 43 | 44 | 44 | 38 | 38 | 42 | 44 | 43 | 43 | 43 | 43 | 38 | 38 | 43 | 43 | 42 |
| 2 | 42 | 45 | 44 | 38 | 39 | 42 | 43 | 45 | 43 | 44 | 43 | 38 | 38 | 44 | 43 | 41 |
| 3 | 41 | 43 | 45 | 39 | 38 | 44 | 44 | 44 | 44 | 44 | 42 | 39 | 38 | 45 | 42 | 42 |
| 4 | 42 | 43 | 44 | 39 | 38 | 43 | 43 | 45 | 44 | 43 | 42 | 39 | 39 | 44 | 43 | 41 |
| 5 | 42 | 44 | 43 | 38 | 39 | 42 | 43 | 44 | 43 | 43 | 43 | 38 | 39 | 44 | 44 | 42 |
| 6 | 43 | 44 | 43 | 39 | 38 | 39 | 39 | 39 | 39 | 38 | 38 | 39 | 39 | 43 | 44 | 41 |
| 7 | 43 | 45 | 43 | 38 | 38 | 39 | 38 | 38 | 38 | 38 | 39 | 38 | 38 | 43 | 43 | 42 |
| 8 | 43 | 44 | 43 | 39 | 38 | 43 | 43 | 44 | 44 | 43 | 43 | 38 | 38 | 42 | 45 | 43 |
| 9 | 43 | 45 | 44 | 39 | 38 | 43 | 44 | 45 | 45 | 44 | 44 | 39 | 38 | 43 | 44 | 42 |
| 10 | 42 | 44 | 44 | 39 | 38 | 44 | 42 | 42 | 43 | 43 | 43 | 38 | 38 | 44 | 43 | 42 |
| 11 | 41 | 44 | 44 | 38 | 38 | 43 | 42 | 43 | 42 | 43 | 44 | 38 | 38 | 42 | 42 | 41 |
| 12 | 42 | 43 | 43 | 38 | 38 | 43 | 42 | 43 | 42 | 43 | 43 | 38 | 38 | 43 | 42 | 41 |

TB1(3)

go to step S1 of FIG. 26

ILLUMINATION DEVICE AND DISPLAY DEVICE INCLUDING THE SAME

CROSS REFERENCE TO RELATED APPLICATIONS

This application claims priority under 35 U.S.C. §119(a) on Patent Application Nos. 2011-175915 filed in Japan on Aug. 11, 2011, and 2012-157990 filed in Japan on Jul. 13, 2012, the entire contents of which are hereby incorporated by reference.

FIELD OF THE INVENTION

The present invention relates to illumination devices including a light source in which a plurality of light emitting elements are arranged (e.g., a planar light source) and display devices including the illumination devices.

DESCRIPTION OF THE RELATED ART

Illumination devices (specifically, a backlight device) including a light source (specifically, a backlight light source serving as a planar light source) in which a plurality of light emitting elements (e.g., light emitting diodes (LEDs), etc.) have in recent years been widely used in display devices, such as monitors of computers (personal computers, etc.), television sets, and the like.

In such illumination devices, if the temperature distribution characteristics are not uniform, the luminance may also not be uniform, i.e., luminance non-uniformity may occur. In particular, in the planar light source, if the temperature distribution characteristics are not uniform, it is often that the luminance is not uniform in the light emitting surface of the planar light source, i.e., luminance non-uniformity occurs in the light emitting surface.

Specifically, most light emitting elements typically have characteristics indicating that the temperature and the luminous intensity are negatively correlated with each other (i.e., characteristics that as the ambient temperature increases, the relative luminous intensity decreases).

Therefore, due to the non-uniformity of the temperature distribution characteristics, the emission efficiency of the light emitting element varies depending on the position in the light emitting portion, and therefore, luminance non-uniformity occurs. For example, due to the non-uniformity of the temperature distribution characteristics of the planar light source, the emission efficiency of the light emitting element varies depending on the position in the light emitting surface, and therefore, luminance non-uniformity is likely to occur in the light emitting surface. Therefore, there is a demand for a light source having uniform luminance irrespective of the non-uniformity of the temperature distribution characteristics (particularly, a planar light source having uniform luminance in the light emitting surface).

In this regard, an illumination device has been previously proposed in which the luminous intensities of a plurality of light emitting diodes arranged in a planar light source are controlled based on the results of detection by temperature detectors which detect the temperatures of the light emitting diodes (see, for example, JP 2006-147373 A and JP 2009-016913 A (a domestic publication of a PCT international publication)).

SUMMARY OF THE INVENTION

However, as described in JP 2006-147373 A and JP 2009-016913 A, in an illumination device in which the luminous intensities of a plurality of light emitting elements arranged in a planar light source are controlled based on the results of detection by temperature detectors which detect the temperatures of the light emitting elements, the planar light source needs to include a large number of temperature detectors, and the luminous intensities of the light emitting elements corresponding to the respective temperature detectors need to be controlled based on the results of detection by the large number of temperature detectors, in order to achieve uniform luminance in the light emitting surface, disadvantageously leading to a proportionate increase in the complexity and size of the control configuration.

Therefore, it is an object of the present invention to provide an illumination device including a light source in which a plurality of light emitting elements are arranged, in which the luminance can be caused to be uniform irrespective of the non-uniformity of the temperature distribution characteristics without an increase in the complexity and size of the control configuration, and a display device including the illumination device.

To achieve the object, an illumination device according to the present invention includes a light source in which a plurality of light emitting elements are arranged, a luminous intensity controller configured to control luminous intensities of the plurality of light emitting elements separately in groups of one or more light emitting elements, and a predetermined correction table indicating temperature distribution characteristics corresponding to position information of the plurality of light emitting elements in the light source. The luminous intensity controller controls the luminous intensities of the plurality of light emitting elements corresponding to the position information based on the temperature distribution characteristics of the correction table.

A display device according to the present invention includes the illumination device of the present invention.

According to the present invention, the luminous intensity controller controls the luminous intensities of the plurality of light emitting elements corresponding to the position information based on the temperature distribution characteristics of the correction table. Therefore, unlike the conventional art, it is not necessary to provide a temperature detector which detects the temperature of the light emitting element. Therefore, the luminance can be caused to be uniform irrespective of the non-uniformity of the temperature distribution characteristics without an increase in the complexity and size of the control configuration.

Incidentally, when the orientation of the illumination device is changed, the temperature distribution characteristics change depending on the states of components of the illumination device, such as the arrangement of a component (e.g., a frame, etc.), protruding and recessed portions of an internal structure, the position of a ventilating opening provided in an external structure, and the like. As a result, a difference may occur between influences of heat on each of the light emitting elements before and after the change of the orientation of the illumination device. Therefore, the emission efficiency of each of the light emitting element also varies due to the change of the orientation of the illumination device, leading to luminance non-uniformity.

In view of this, in the present invention, the illumination device may further include an orientation detector configured to detect an orientation of the illumination device. The correction table is previously provided for each of a plurality of predetermined orientations of the illumination device. The luminous intensity controller may select one of the correction tables provided for the plurality of orientations of the illumination device based on detection data from the orientation detector, and may control the light intensities of the plurality of light emitting elements corresponding to the position information based on the temperature distribution characteristics of the selected correction table.

In this case, when the orientation of the illumination device is changed, the temperature distribution characteristics change depending on the states of components of the illumination device, such as the arrangement of a component (e.g., a frame, etc.), protruding and recessed portions of an internal structure, the position of a ventilating opening provided in an external structure, and the like, and therefore, a difference may occur between influences of heat on each of the light emitting elements before and after the change of the orientation of the illumination device. However, the luminous intensity controller selects one of the correction tables provided for the plurality of orientations of the illumination device based on detection data from the orientation detector, and controls the light intensities of the plurality of light emitting elements corresponding to the position information based on the temperature distribution characteristics of the selected correction table. Therefore, even if the orientation of the illumination device is changed, the light emitting elements can be caused to have uniform emission efficiency. Therefore, even if the orientation of the illumination device is changed, the luminance can be caused to be uniform.

In the present invention, the orientation detector may include an angle detector configured to detect a first rotation angle between an X axis extending along a horizontal direction of the illumination device and a Z axis extending along a vertical direction perpendicular to the horizontal direction, and a second rotation angle between a Y axis extending along a horizontal direction perpendicular to the X axis of the illumination device and the Z axis.

In this case, the angle detector can detects the first rotation angle between the X and Z axes of the illumination device and the second rotation angle between the Y and Z axes of the illumination device. As a result, various orientations of the illumination device can be accurately detected. Therefore, the illumination device can be controlled in association with various orientations.

In the present invention, the light source may be a planar light source. The correction table may indicate the temperature distribution characteristics in the planar light source corresponding to the position information of the plurality of light emitting elements in the planar light source.

In this case, the luminance of the light emitting surface of the planar light source can be caused to be uniform irrespective of the non-uniformity of the temperature distribution characteristics in the planar light source.

Incidentally, in the present invention, when the light source is a planar light source, then if a heat dissipation member is provided at a portion of a back surface opposite to a light emitting surface of the planar light source, heat of the planar light source is easily discharged by the heat dissipation member. As a result, heat is not uniformly discharged due to the heat dissipation member, so that the temperature distribution characteristics are likely to be non-uniform in the planar light source.

Therefore, the present invention is particularly effective when a heat dissipation member is provided at a portion of the back surface opposite to the light emitting surface of the planar light source.

As used herein, the term "heat dissipation member" encompasses, for example, a support member which supports the planar light source and also secondarily serves as a heat dissipation member, instead of one that is originally intended to perform heat dissipation.

Metal members typically have excellent thermal conductivity. If a metal member is employed as the heat dissipation member, heat is less uniformly dissipated clue to the heat dissipation member, so that the temperature distribution characteristics are likely to be more non-uniform in the planar light source.

Therefore, the present invention is more effective when the heat dissipation member is a metal member.

The supporting frame for supporting the planar light source is typically provided at a center portion (other than peripheral portions) of the planar light source. In this case, the temperature is likely to decrease at a center portion of the temperature distribution characteristics in the planar light source. Therefore, the luminance non-uniformity of the light emitting surface of the planar light source is likely to be conspicuous.

Therefore, the present invention is more effective when the heat dissipation member serves as a supporting frame for supporting the planar light source.

In the present invention, when a cooling device is provided at a portion of the back surface opposite to the light emitting surface of the planar light source, heat generated in the planar light source is easily discharged by the cooling device. As a result, heat is not uniformly dissipated by the cooling device, so that the temperature distribution characteristics in the planar light source are likely to be non-uniform.

Therefore, the present invention is particularly effective when a cooling device is provided at a portion of the back surface opposite to the light emitting surface of the planar light source.

In the present invention, the luminous intensity controller controls the luminous intensities of the plurality of light emitting elements based on temperature differences between temperature settings at positions corresponding to the plurality of light emitting elements in the temperature distribution characteristics of the correction table, and a reference temperature which is used as a reference for a luminous intensity control of controlling the luminous intensity.

In this case, the luminous intensity controller controls the luminous intensities of the plurality of light emitting elements depending on the temperature differences, whereby the luminance can be caused to be uniform using the simple control configuration.

In the present invention, the luminous intensity controller decreases the luminous intensities of any one or more of the plurality of light emitting elements that have characteristics indicating a negative correlation relationship between the temperature and the luminous intensity and have a lower temperature setting than the reference temperature, by an amount corresponding to the temperature difference.

As used herein, the "negative correlation relationship" refers to a relationship that as the temperature increases, the luminous intensity decreases, and as the temperature decreases, the luminous intensity increases.

In this case, the luminous intensity controller decreases the luminous intensities of any one or more of the plurality of light emitting elements that have characteristics indicating the negative correlation relationship and have a lower temperature setting than the reference temperature, by an amount corresponding to the temperature difference. While the overall power consumption is thereby reduced, the luminance can be caused to be uniform.

In the present invention, the luminous intensity controller increases the luminous intensities of any one or more of the plurality of light emitting elements that have characteristics indicating a negative correlation relationship between the temperature and the luminous intensity and have a higher temperature setting than the reference temperature, by an amount corresponding to the temperature difference.

In this case, the luminous intensity controller increases the luminous intensities of any one or more of the plurality of light emitting elements that have characteristics indicating the negative correlation relationship and have a higher temperature setting than the reference temperature, by an amount corresponding to the temperature difference. While the overall luminance is thereby increased, the luminance can be caused to be uniform.

In the present invention, the reference temperature may be a highest temperature setting in the temperature distribution characteristics.

In this case, the present invention can be effectively applied to any one or more of the plurality of light emitting elements whose luminous intensities cannot be further increased, e.g., any light emitting element that emits light with a highest luminous intensity.

Incidentally, the plurality of light emitting elements in the light source (e.g., the planar light source) may emit light having a single color. Alternatively, a plurality of light emitting element groups each including the plurality of light emitting elements may be provided, and the plurality of light emitting elements in the plurality of light emitting element groups may emit light having colors different between the plurality of light emitting element groups. The light source may emit light having a predetermined color by combining light beams of the plurality of light emitting elements in the plurality of light emitting element groups. In this case, the luminous intensity controller controls the luminous intensities of the plurality of light emitting elements in each of the plurality of light emitting element groups, separately in groups of one or more light emitting elements.

In this case, even when the light source emits light having a predetermined color by combining light beams of the plurality of light emitting elements in the plurality of light emitting element groups, the luminance can be effectively caused to be uniform. Thus, the luminance can be caused to be uniform while the hue of the predetermined color is maintained constant.

In the present invention, a display image of the display device may be divided into sub-regions, and the luminous intensity controller may control the luminous intensities of any one or more of the plurality of light emitting elements that correspond to each of the sub-regions based on a lightness or darkness of the each of the sub-regions.

In this case, the luminous intensity controller controls the luminous intensities of any one or more of the plurality of light emitting elements that correspond to each of the sub-regions in a display image of the display device, based on the lightness or darkness of the each of the sub-regions. Therefore, the luminance can be caused to be uniform irrespective of the non-uniformity of the temperature distribution characteristics, and the luminous intensities of the light emitting elements corresponding to each sub-region can be controlled depending on the lightness or darkness of that sub-region. As a result, in the display device, the contrast can be stably increased and the power consumption can be stably reduced.

BRIEF DESCRIPTION OF THE DRAWINGS

FIG. 7 is a plan view schematically showing an example state in which white LEDs are divided into groups on an LED substrate in a backlight light source.

FIG. 10 is a diagram schematically showing a data structure of a temperature distribution correction table indicating the temperature distribution characteristics of the backlight light source.

FIG. 12 is a diagram schematically showing a data structure of a temperature correction table in which a highest temperature setting is a reference temperature.

FIG. 14 is a diagram schematically showing a data structure of a temperature correction table in which an intermediate temperature setting is a reference temperature.

FIG. 22 is a diagram schematically showing a data structure of a first temperature distribution correction table TB1(1) corresponding to the vertical landscape orientation of the liquid crystal display device.

FIG. 23 is a diagram schematically showing a data structure of a second temperature distribution correction table TB1(2) corresponding to the vertical portrait orientation of the liquid crystal display device.

FIG. 24 is a diagram schematically showing a data structure of a third temperature distribution correction table TB1(3) corresponding to the horizontally lying orientation of the liquid crystal display device.

DESCRIPTION OF THE PREFERRED EMBODIMENTS

Embodiments of the present invention will be described hereinafter with reference to the accompanying drawings. Note that the following embodiments of the present invention are only for illustrative purposes and are not intended to limit the technical scope of the present invention.

First Embodiment

Firstly, a configuration of a television receiver TV including a liquid crystal display device 10 will be described before a configuration of the liquid crystal display device 10 will be described.

Figure 1:
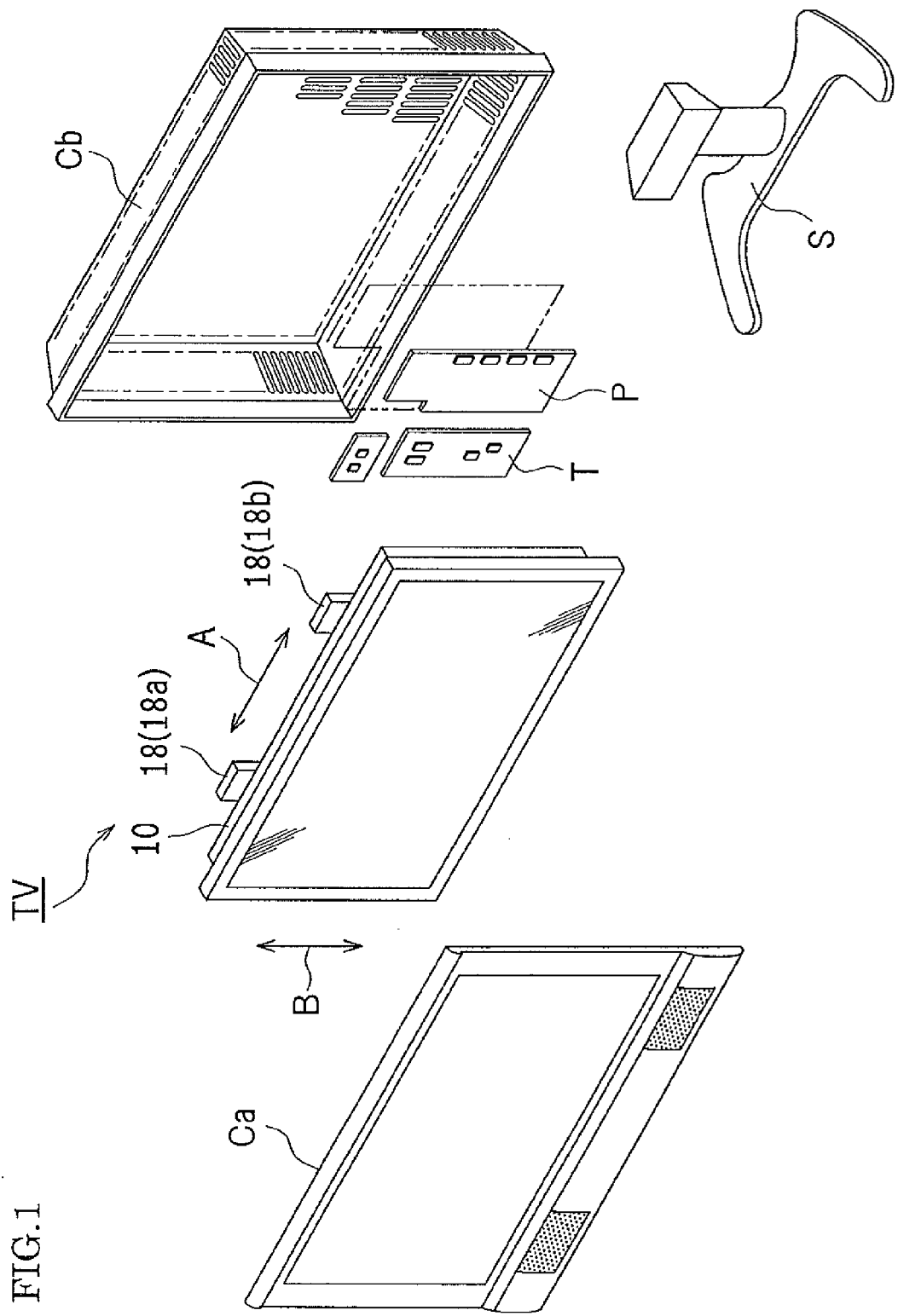
FIG. 1 is an exploded perspective view schematically showing a configuration of a television receiver including a liquid crystal display device which is a display device according to a first embodiment.
Figure 2:
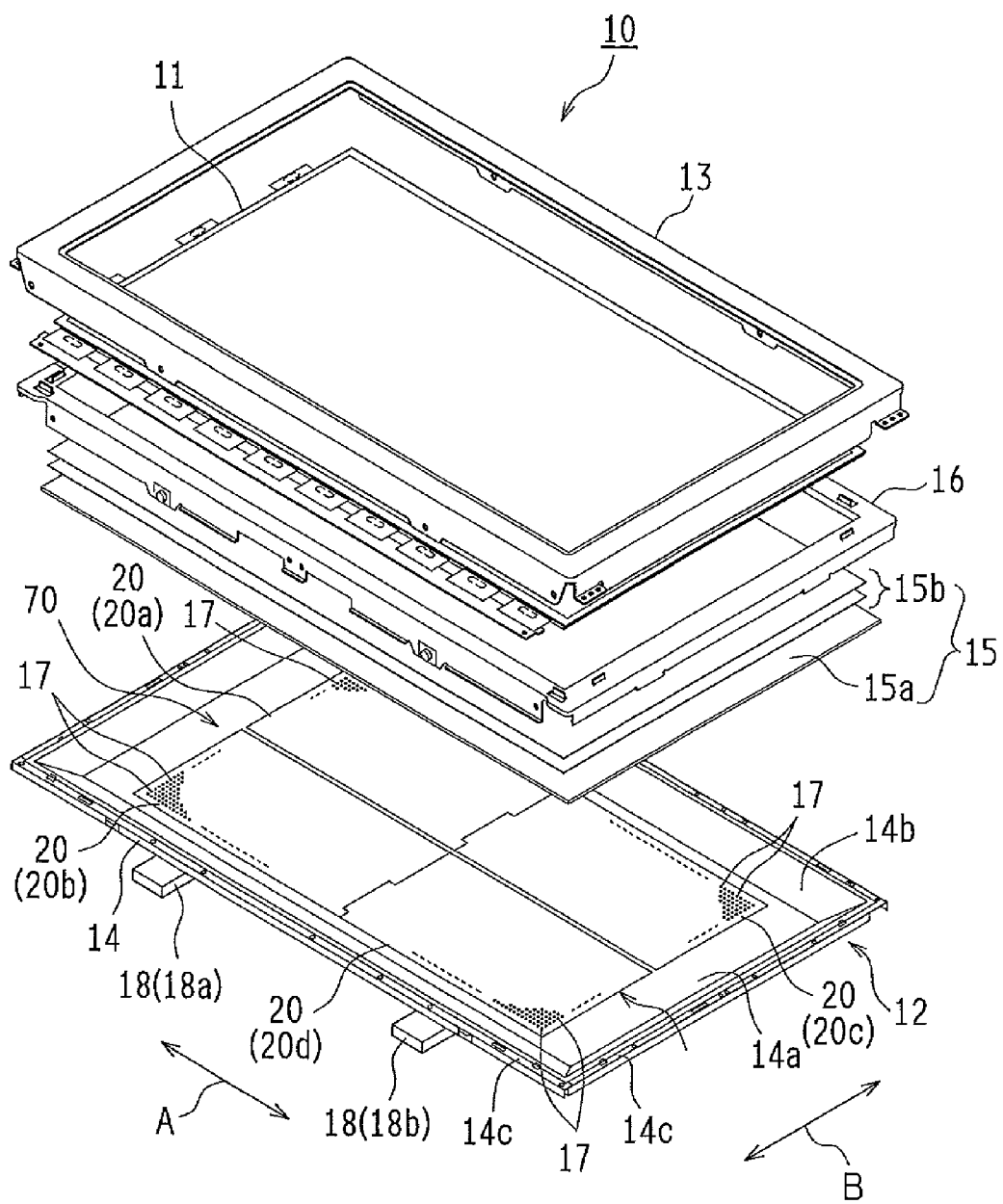
FIG. 2 is an exploded perspective view schematically showing the liquid crystal display device in the television receiver of FIG. 1.
Figure 3:
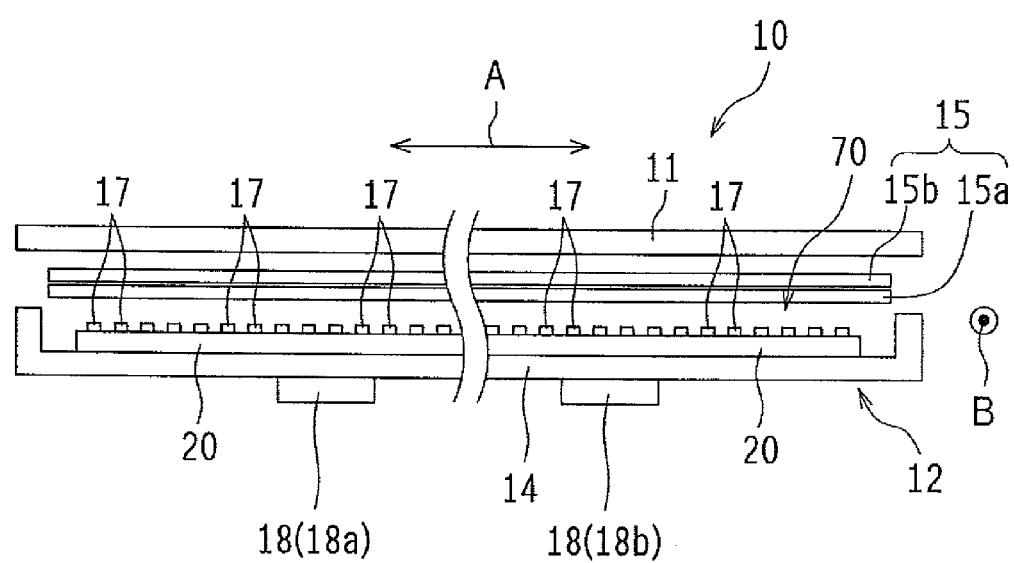
FIG. 3 is a cross-sectional view schematically showing a portion of the liquid crystal display device of FIGS. 1 and 2.

FIG. 1 is an exploded perspective view schematically showing the configuration of the television receiver TV including the liquid crystal display device 10 which is a display device according to a first embodiment. FIG. 2 is an exploded perspective view schematically showing the liquid crystal display device 10 in the television receiver TV of FIG. 1. FIG. 3 is a cross-sectional view schematically showing a portion of the liquid crystal display device 10 of FIGS. 1 and 2. Note that a bezel 13, a frame 16, and the like are not shown in FIG. 3.

As shown in FIG. 1, the television receiver TV includes the liquid crystal display device 10, a front and a rear cabinet Ca and Cb which sandwich and house the liquid crystal display device 10, a power supply P, a tuner T, and a stand S.

The liquid crystal display device 10 is in the shape of a landscape rectangle and housed in a vertical landscape orientation. In this example, the liquid crystal display device 10 has a 60-inch display screen. As shown in FIG. 2, the liquid crystal display device 10 includes a liquid crystal panel 11, and a backlight device (an example illumination device) 12 which illuminates the liquid crystal panel 11 from the back. The liquid crystal panel 11 and the backlight device 12 are integrally held by a holding member, such as the frame-shaped bezel 13 and the like.

Next, the liquid crystal panel 11 and backlight device 12 included in the liquid crystal display device 10 will be described.

In the liquid crystal panel 11, a pair of glass substrates are bonded together with a predetermined gap being interposed therebetween, and liquid crystal is enclosed between the glass substrates, although detailed components thereof are not shown.

Switching elements (e.g., TFTs) connected to source and gate lines intersecting each other at right angles, pixel electrodes connected to the switching elements, an alignment film, and the like are provided on one of the glass substrates.

A color filter in which color portions of R (red), G (green), B (blue), etc. are arranged in a predetermined pattern, counter electrodes, an alignment film, and the like are provided on the other glass substrate. Note that a polarizing plate is provided outside both of the substrates.

As shown in FIG. 2, the backlight device 12 includes a generally box-shaped chassis 14 (an example housing) having an opening toward a light emitting surface (the liquid crystal panel 11 side), an optical sheet set 15 covering the opening of the chassis 14, the frame 16 extending along an outer edge of the chassis 14 with outer edge portions of the optical sheet set 15 being sandwiched and held between the frame 16 and the chassis 14, a plurality of white-light emitting diodes (example light emitting elements, hereinafter referred to as white LEDs) LEDs 17, . . . , and an LED substrate (example substrate) 20 on which the white LEDs 17, . . . are mounted. The optical sheet set 15 includes a diffusion plate 15a, and one or more optical sheets 15b provided between the diffusion plate 15a and the liquid crystal panel 11.

The chassis 14 houses the LED substrate 20 on which the white LEDs 17, . . . are mounted. In the first embodiment, the chassis 14, the white LEDs 17, . . . , and the LED substrate 20 constitute a backlight light source (example planar light source) 70 which serves as a planar light source. Note that, in the backlight device 12, the diffusion plate 15a side is the light emitting surface side with respect to the white LEDs 17, . . . .

Specifically, the chassis 14 is formed of following metal members: a bottom plate 14a has a rectangular shape as with the liquid crystal panel 11, side plates 14b rising from outer edges of the sides of the bottom plate 14a, and backing plates 14c protruding outward from top ends of the side plates 14b. The chassis 14 has a generally box shape having an opening toward the front.

Specifically, the frame 16 is mounted on the backing plates 14c of the chassis 14 with the outer edge portion of the optical sheet set 15 being sandwiched between the backing plates 14c and the frame 16.

The optical sheet set 15 including the diffusion plate 15a and the optical sheet 15b is provided on the opening side of the chassis 14. The diffusion plate 15a is a plate-shaped member made of synthetic resin in which light-scattering particles are dispersed, and has a function of diffusing point-like light beams emitted from the white LEDs 17, . . . . As described above, the outer edge portion of the diffusion plate 15a is mounted on the backing plates 14c of the chassis 14, and therefore, does not receive strong binding force in the vertical direction.

The optical sheet 15b provided on the diffusion plate 15a is a thin sheet having a smaller thickness than that of the diffusion plate 15a, and includes two sheets stacked together. Specific examples of the optical sheet 15b include a diffusion sheet, a lens sheet, a reflective polarizing sheet, and the like. The optical sheet 15b may be appropriately selected from these sheets. The optical sheet 15b has a function of producing plane-like light from light which has been emitted from the white LEDs 17, . . . and passed through the diffusion plate 15a. The optical sheet 15b serves as the light emitting surface on a side opposite to the white LEDs 17, . . . . The liquid crystal panel 11 is provided on the light emitting surface side of the optical sheet 15b.

In the first embodiment, the backlight device 12 further includes a heat dissipation member 18. The heat dissipation member 18 is formed of a metal member provided on a portion of the back surface opposite to the light emitting surface of the backlight light source 70 (specifically, the back surface of the chassis 14). As a result, the heat dissipation member 18 can dissipate heat generated by the body of the backlight device 12 through a portion of the back surface of the chassis 14.

Specifically, the heat dissipation member 18 is a supporting frame which supports the backlight light source 70, and includes a plurality of (here, a pair of) heat dissipation members 18a and 18b. The pair of heat dissipation members 18a and 18b are elongated members extending in a column direction B. Of the pair of heat dissipation members 18a and 18b, the heat dissipation member 18a supports the chassis 14 at a portion on one side in a row direction A of the back surface of the chassis 14, extending across the chassis 14 along the column direction B, and the heat dissipation member 18b supports the chassis 14 at a portion on the other side in the row direction A of the back surface of the chassis 14, extending across the chassis 14 along the column direction B. The pair of heat dissipation members 18a and 18b are evenly provided in the row direction A on the back surface of the chassis 14. In the backlight device 12, the pair of heat dissipation members 18a and 18b supporting the chassis 14 is supported by the rear cabinet Cb of the television receiver TV.

While, in the first embodiment, the heat dissipation member 18 includes the pair of heat dissipation members 18a and 18b, the heat dissipation member 18 may include three or more heat dissipation members or a single dissipation member, depending on the size of the display screen, for example. Specifically, the number of heat dissipation members may be increased with an increase in the size of the display screen.

If the heat dissipation member 18 includes a single heat dissipation member, the heat dissipation member 18 may specifically be provided at a middle in the row direction A of the back surface of the chassis 14, extending across the chassis 14 along the column direction B, or at a middle in the column direction B of the back surface of the chassis 14, extending across the chassis 14 along the row direction A, to support the chassis 14, for example.

In the first embodiment, the LED substrate 20 is provided in the chassis 14. Specifically, the LED substrate 20 on which the white LEDs 17, . . . are mounted is provided on the inner surface of the bottom plate 14a of the chassis 14. The LED substrate 20 is made of synthetic resin. An interconnect pattern (not shown) made of metal film, such as copper foil or the like, is formed on a surface of the LED substrate 20.

In the first embodiment, the LED substrate 20 may be in the shape of a rectangle which is longer in the row direction A. A plurality of land patterns (not shown) are formed, corresponding to the plurality of white LEDs 17, . . . , on the surface of the LED substrate 20 in addition to the interconnect pattern (not shown).

In the first embodiment, the LED substrate 20 is divided into a plurality of (here, four) LED substrates 20a, 20b, 20c, and 20d (specifically, the LED substrate 20 is divided into two in each of the row and column directions A and B, i.e., a total of four). The same numbers of white LEDs 17, . . . arranged in the same pattern are provided in the respective LED substrates 20a, 20b, 20c, and 20d, i.e., are arranged side by side.

Figure 4:
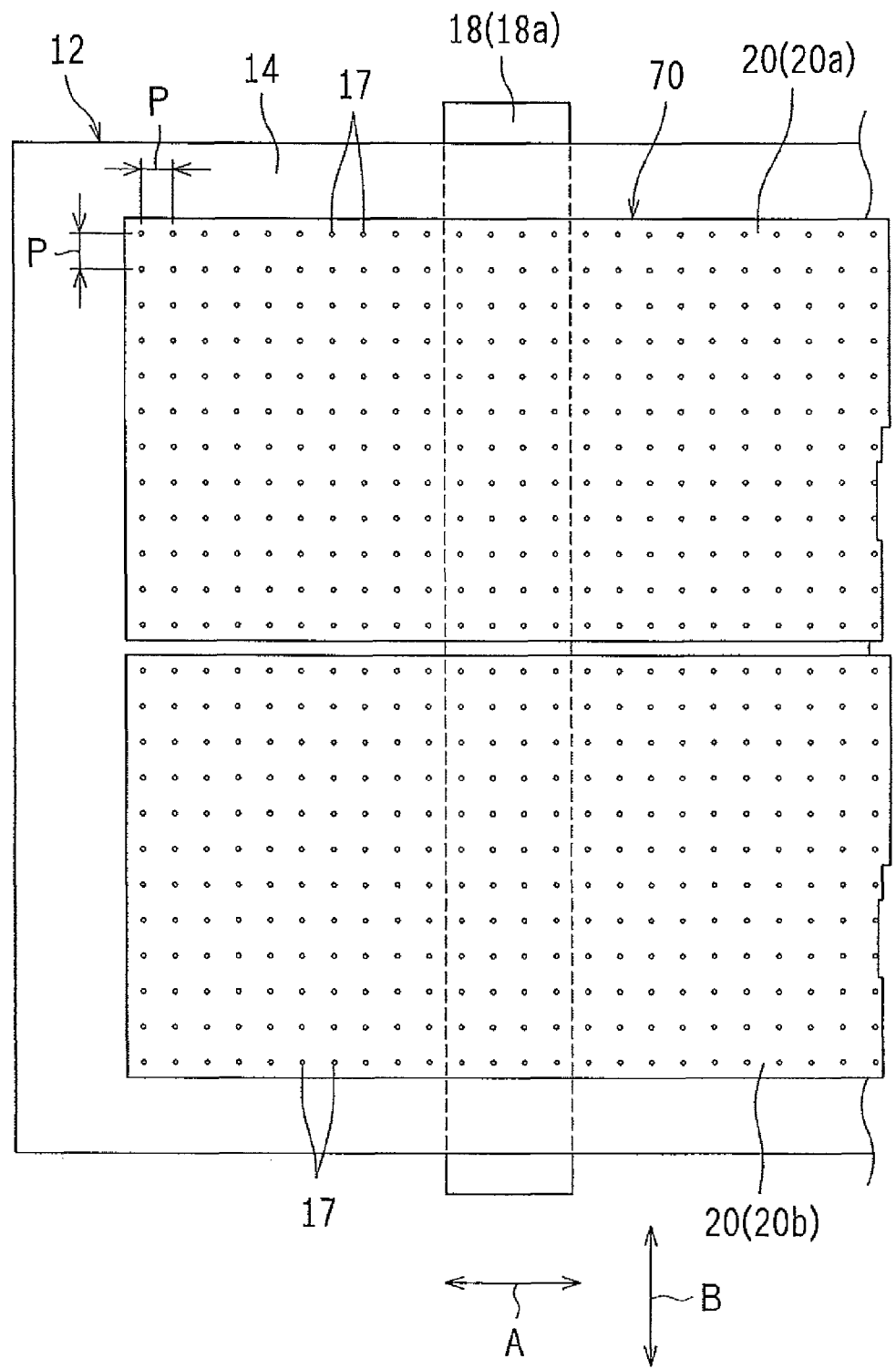
FIG. 4 is a plan view schematically showing a backlight device shown in FIGS. 2 and 3 with an optical sheet set removed, as viewed from the front, indicating two LED substrate portions which are provided on both sides (top and bottom sides) in a column direction on one side (left side) in a row direction of the backlight device.
Figure 5:
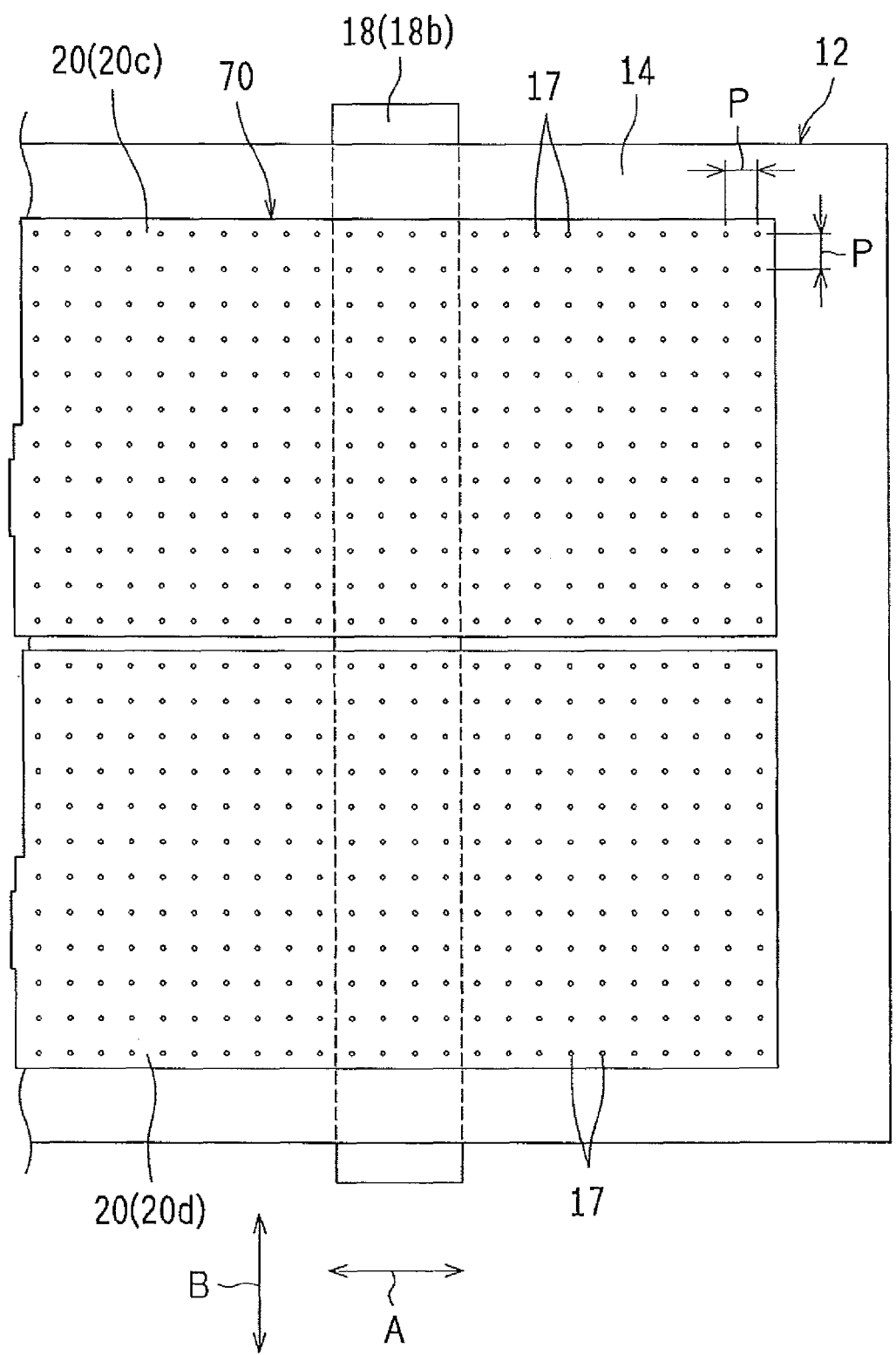
FIG. 5 is a plan view schematically showing the backlight device shown in FIGS. 2 and 3 with the optical sheet set removed, as viewed from the front, indicating two LED substrate portions which are provided on both sides (top and bottom sides) in the column direction on the other side (right side) in the row direction of the backlight device.

FIGS. 4 and 5 are plan views schematically showing the backlight device 12 of FIGS. 2 and 3 as viewed from the front, with the optical sheet set 15 removed. FIG. 4 shows the two portions 20a and 20b of the LED substrate 20 which are provided on both sides (top and bottom sides) in the column direction B on one side (left side) in the row direction A of the backlight device 12. FIG. 5 shows the two portions 20c and 20d of the LED substrate 20 which are provided on both sides (top and bottom sides) in the column direction B on the other side (right side) in the row direction A of the backlight device 12.

As shown in FIGS. 4 and 5, on each of the LED substrates 20a, 20b, 20c, and 20d, the white LEDs 17, . . . are mounted and arranged in a matrix (grid) and equally spaced by a predetermined pitch P (here, 24 LEDs are provided in the row direction A while 12 LEDs are provided in the column direction B).

Note that the arrangement of the white LEDs 17, . . . on each of the LED substrates 20a, 20b, 20c, and 20d is not limited to a matrix, and may be arranged in any pattern if the white LEDs 17, . . . are equally spaced.

The white LEDs 17, . . . are of the same model (i.e., the same configuration and structure). Here, the white LEDs 17, . . . are each a point light source in which a blue LED (light emission) chip is covered with an encapsulation resin containing a red fluorescent material and a green fluorescent material. Note that the encapsulation resin may contain a yellow fluorescent material. Specifically, the white LED 17 may be allowed to emit white light by applying to a blue LED (light emission) chip a fluorescent material having a light emission peak in a yellow region. Alternatively, for example, the white LED 17 may be allowed to emit white light by applying to a blue LED (light emission) chip a fluorescent material having a light emission peak in both green and red regions.

Figure 6:
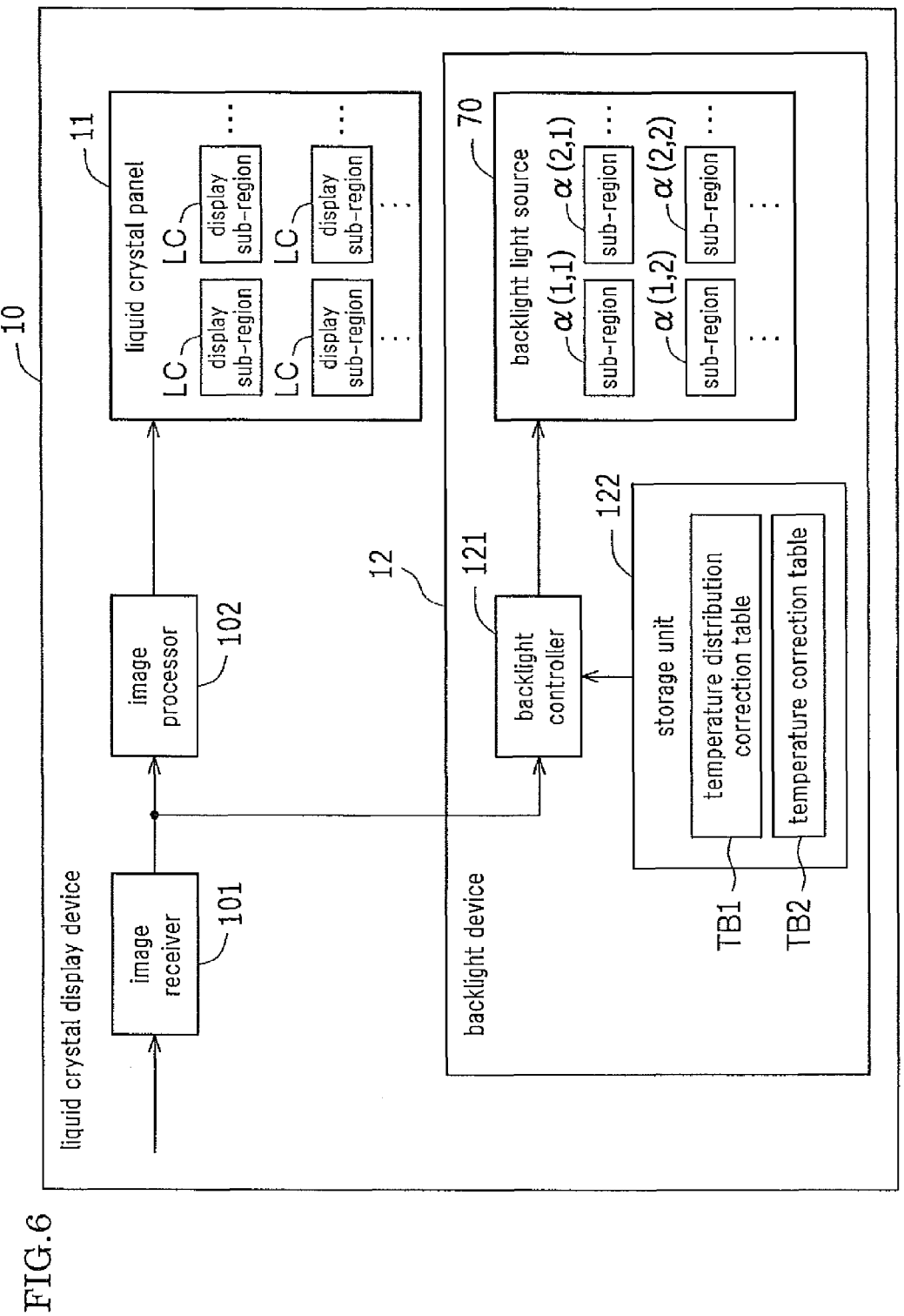
FIG. 6 is a block diagram schematically showing a control configuration for the backlight device in the liquid crystal display device of the first embodiment.

FIG. 6 is a block diagram schematically showing a control configuration for the backlight device 12 in the liquid crystal display device 10 of the first embodiment.

As shown in FIG. 6, the liquid crystal display device 10 further includes an image receiver 101 and an image processor 102. The backlight device 12 further includes a backlight controller (example luminous intensity controller) 121 and a storage unit 122.

The image receiver 101 is connected to an image transmitter, such as the tuner T (see FIG. 1) or the like, and receives image data which is transmitted sequentially in time by the image transmitter, and outputs the received image data to the image processor 102 and the backlight controller 121.

The liquid crystal panel 11 receives control data corresponding to image data on a frame-by-frame basis sequentially in time. The control data contains control values corresponding to respective pixels in the image data. Here, the control value corresponding to a pixel is used to control a voltage which the liquid crystal panel 11 is to apply to the liquid crystal portion of that pixel. The liquid crystal panel 11 applies a voltage to the liquid crystal portion of each pixel based on input control data. If the voltage applied to the liquid crystal portion of each pixel has an appropriate value, the liquid crystal panel 11 displays a moving image having high image quality.

The image processor 102 generates control data which is to be output to the liquid crystal panel 11, based on input image data, and outputs the generated control data to the liquid crystal panel 11.

The backlight controller 121 includes a processor (not shown), such as a central processing unit (CPU) or the like. The storage unit 122 includes a storage memory (not shown), such as a read only memory (ROM), a random access memory (RAM), or the like, and stores various data including various control programs, required functions and tables, and a temperature distribution correction table TB1 and a temperature correction table TB2 described below.

In the first embodiment, the backlight controller 121 has a function of controlling the luminous intensities (amounts of light) of the white LEDs 17, . . . separately in groups of one or more white LEDs 17 (here, in groups of a plurality of white LEDs 17).

Specifically, the white LEDs 17, . . . of the backlight light source 70 in the backlight device 12 are each driven and controlled by a luminous intensity signal indicating a luminous intensity (amount of light) input from the backlight controller 121.

Specifically, the backlight controller 121 includes a dimmer circuit (not shown). The dimmer circuit is used to supply power required to turn on the white LEDs 17, . . . so that the white LEDs 17, . . . in the backlight light source 70 are driven and controlled in sub-regions $\alpha(1, 1)$, $\alpha(1, 2)$, . . . , and $\alpha(m, n)$ (described below) separately (i.e., on a sub-region-by-sub-region basis).

In the first embodiment, the backlight controller 121 receives an external control signal and changes drive currents flowing through the white LEDs 17, . . . to control the luminous intensities of the white LEDs 17, . . . . Note that, in the backlight controller 121, the white LEDs 17, . . . are driven and controlled, for example, by the following conventional drive techniques: use of a constant voltage source and a resistor; use of a constant current source; or pulse width modulation (PWM) performed by changing the duty ratios of voltage pulse waves to the white LEDs 17, . . . . Therefore, here, the technique of driving and controlling the white LEDs 17, . . . in the backlight controller 121 will not be described in detail.

Figure 8:
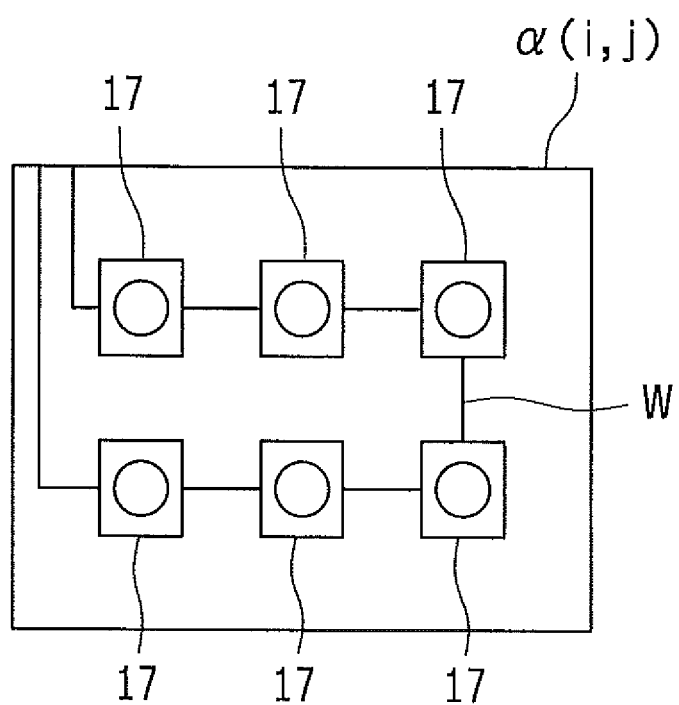
FIG. 8 is a plan view schematically showing one sub-region in FIG. 7, where the white LEDs are driven and controlled separately in groups of six white LEDs.

FIG. 7 is a plan view schematically showing an example state in which the white LEDs 17, . . . are divided into groups (sub-regions) on the LED substrate 20 in the backlight light source 70. FIG. 8 is a plan view schematically showing one sub-region $\alpha(i, j)$ in FIG. 7, where the white LEDs 17, . . . are driven and controlled separately in groups of six white LEDs 17. Note that, of the numbers in the sub-region $\alpha(i, j)$ of FIG. 7, the left number indicates the value of i (=an integer of 1 to m), and the right number indicates the value of j (=an integer of 1 to n). Because all sub-regions $\alpha(i, j)$ have a similar configuration, FIG. 8 shows only one sub-region $\alpha(i, j)$.

The white LEDs 17, . . . on the LED substrate 20 are divided into m×n rectangular sub-regions (here, 16×12=192), i.e., m sub-regions in the row direction A (in is an integer of two or more, and here, m=16) and n sub-regions in the column direction B (n is an integer of two or more, and here, n=12). Specifically, the white LEDs 17, . . . , on each of the LED substrates 20a-20d obtained by dividing the LED substrate 20 are divided into a total of ((m×n)/4) sub-regions (here, 48), i.e., m/2 sub-regions in the row direction A (here, 8 sub-regions) and n/2 sub-regions in the column direction B (here, 6 sub-regions) (see FIG. 7).

Each sub-region $\alpha(i, j)$ contains k white LEDs 17, . . . (k is an integer of two or more) which are connected together in series via an interconnect pattern W (see FIG. 8). The value of k is obtained by dividing (the total of the white LEDs) by (m×n sub-regions). Here, k is six (=(24 rows×12 columns×4 substrates)/192 sub-regions). As a result, the white LEDs 17, . . . in each sub-region $\alpha(i, j)$ are driven and controlled by the backlight controller 121 under the same conditions (specifically, using the same drive current).

Specifically, the backlight controller 121 turns on the white LEDs 17, . . . in each sub-region $\alpha(i, j)$ under the same drive conditions in that sub-region $\alpha(i, j)$, where the luminous intensity of the white LED 17 depends on the luminous intensity signal output to the white LEDs 17, in that sub-region $\alpha(i, j)$. Note that the backlight controller 121 turns off the white LEDs 17, . . . in each sub-region $a(i, j)$ if the luminous intensity signal output to the white LEDs 17, . . . in that sub-region $\alpha(i, j)$ indicates a luminous intensity of zero.

In the first embodiment, the backlight controller 121 performs a sub-regional dimming control (called a local dimming control or an area active control) to adjust the luminous intensities of the white LEDs 17, . . . in any one or more of the sub-regions α(i, j) in the backlight device 12 that correspond to each of display sub-regions LC, . . . obtained by dividing a display image of the liquid crystal display device 10, in synchronization with the lightness or darkness of that display sub-region LC. For example, when a display sub-region LC in a display image on the liquid crystal display device 10 is dark, the backlight controller 121 performs the dimming control in the backlight device 12 to reduce the luminous intensity of the white LEDs 17, . . . in a sub-region(s) α(i, j) corresponding to the dark display sub-region LC. As a result, in the liquid crystal display device 10, the contrast can be increased and the power consumption can be reduced.

Specifically, the backlight controller 121 calculates the luminous intensity of the white LEDs 17, . . . in each sub-region α(i, j) based on input image data, and outputs a luminous intensity signal corresponding to the calculation result to the white LEDs 17, . . . in that sub-region α(i, j). Specifically, when image data is input to the liquid crystal panel 11, the backlight controller 121 calculates, based on the pixel values of the image data, the brightness, color, and the like of an image to be displayed in the rectangular display sub-regions LC, . . . of the liquid crystal panel 11 corresponding to the sub-regions α(i, j) of the backlight device 12. Based on the calculation result, the backlight controller 121 also calculates the luminous intensities of the white LEDs 17, . . . in the sub-regions α(i, j) which illuminate the display sub-regions LC, . . . of the liquid crystal panel 11, and outputs a luminance signal corresponding to the calculation result to the white LEDs 17, . . . of each sub-region α(i, j).

The backlight device 12 having the above control configuration illuminates each of the display sub-regions LC, . . . of the liquid crystal panel 11 with a luminous intensity which provides a luminance suitable for the color, brightness, and the like of a moving image to be displayed in that display sub-regions LC, . . . . Specifically, the backlight device 12 illuminates a display sub-region(s) LC of the liquid crystal panel 11 in which a bright moving image or a conspicuous color moving image is to be displayed a region that is easy for the user to pay attention), with a luminous intensity which provides a high luminance. On the other hand, the backlight device 12 illuminates a display sub-region(s) LC of the liquid crystal panel 11 in which a dark moving image or an inconspicuous color moving image is to be displayed (i.e., a region that is not easy for the user to pay attention), with a luminous intensity which provides a low luminance.

Incidentally, in the backlight device 12, if the temperature distribution characteristics during temperature saturation (at a highest temperature) of the backlight light source 70 are not uniform, the luminance of the light emitting surface of the backlight light source 70 may not be uniform, i.e., luminance non-uniformity may occur in the light emitting surface.

Figure 9:
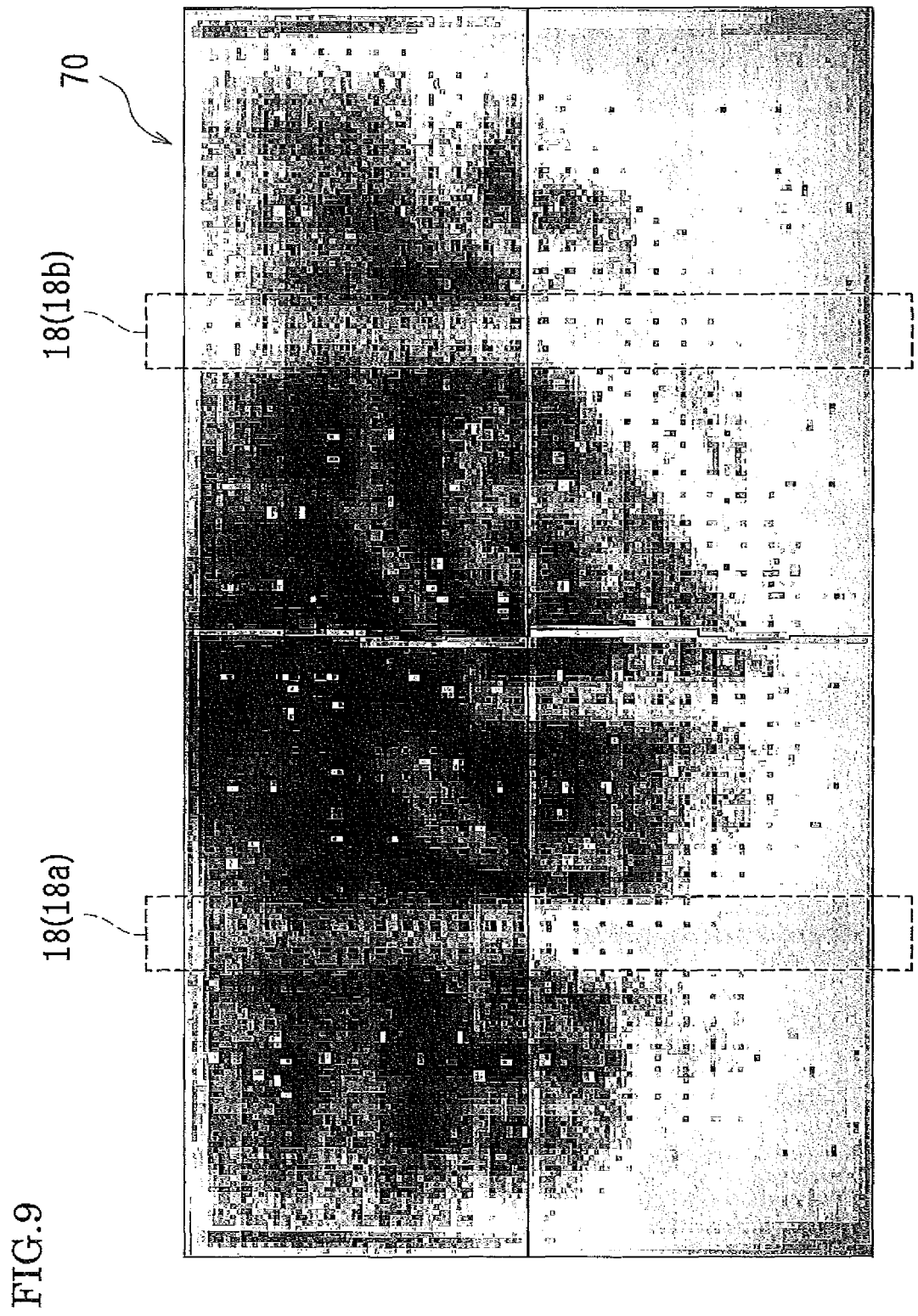
FIG. 9 is a diagram showing a temperature distribution indicating the result of a thermography measurement on the backlight light source in the backlight device of the first embodiment during temperature saturation as measured from the front.

FIG. 9 is a diagram showing a temperature distribution indicating the result of a thermography measurement on the backlight light source 70 in the backlight device 12 of the first embodiment during temperature saturation as measured from the front. Note that, in FIG. 9, darker color indicates higher temperature. Dashed lines indicate the heat dissipation members 18a and 18b.

In the temperature distribution of FIG. 9, of the light emitting surface of the backlight light source 70, the temperatures of portions corresponding to the heat dissipation members 18a and 18b are lower than the temperatures of portions adjacent thereto by about 3° C. to about 5° C. The temperature of an upper portion is higher than the temperature of a lower portion. The difference between the highest and lowest temperatures is about 11° C.

In the first embodiment, as position information of the white LEDs 17, . . . of the backlight light source 70, each sub-region α(i, j) is previously stored in association with the white LEDs 17, . . . provided in that sub-region α(i, j), in the storage unit 122 (see FIG. 6). A temperature distribution correction table TB1 which indicates the temperature distribution characteristics of the backlight light source 70 corresponding to the sub-regions α(i, j) corresponding to the white LEDs 17, . . . is previously stored in the storage unit 122.

FIG. 10 is a diagram schematically showing a data structure of the temperature distribution correction table TB1 indicating the temperature distribution characteristics of the backlight light source 70. Note that, in FIG. 10, hatched portions indicate portions corresponding to the heat dissipation members 20a and 20b.

As shown in FIG. 10, the temperature distribution correction table TB1 contains a temperature setting for each sub-region α(i, j) during temperature saturation of the white LEDs 17, . . . .

On other hand, most LEDs typically have characteristics indicating that the temperature and the luminous intensity are negatively correlated with each other.

Figure 11:
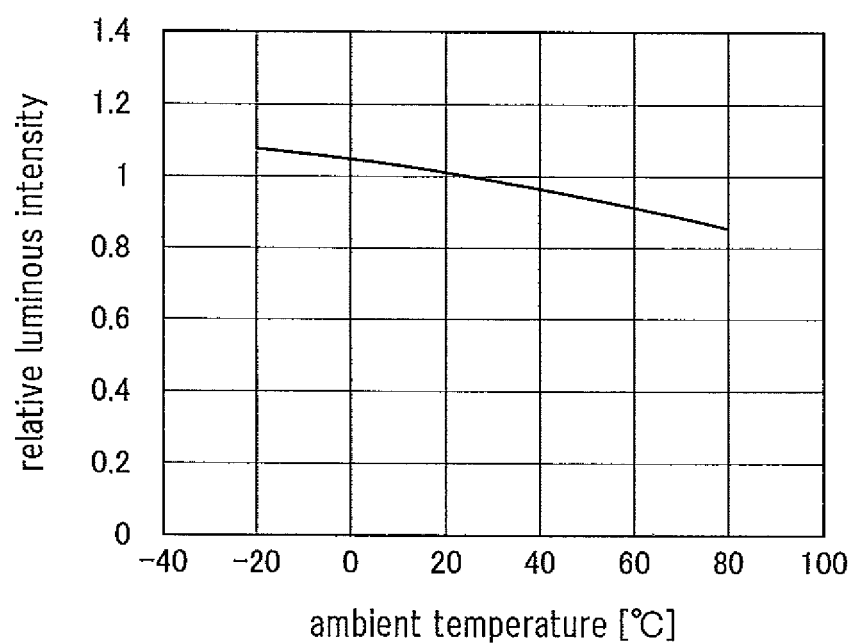
FIG. 11 is a graph showing a relationship between the ambient temperature and relative luminous intensity of the white LED provided in the backlight light source.

FIG. 11 is a graph showing a relationship between the ambient temperature and relative luminous intensity of the white LED 17 provided in the backlight light source 70. Note that, in FIG. 11, the vertical axis indicates relative luminous intensities (proportions), where the luminous intensity of the white LED 17 has a value of one when the white LED 17 is driven based on a predetermined reference luminous intensity signal (here, a reference current (specifically, 20 mA)) and the ambient temperature is 25° C. Note that the reference luminous intensity signal is used as a reference when the sub-regional dimming control is not performed.

Here, as described above, the white LEDs 17, . . . in the backlight device 12 are of the same model (i.e., the same configuration and structure), and therefore, have similar ambient temperature-vs-relative luminous intensity relationships. Therefore, FIG. 11 shows only one white LED 17 that is representative of all of the white LEDs 17, . . . in the backlight device 12.

As shown in FIG. 11, the white LED 17 of the backlight light source 70 has characteristics (characteristics indicating a negative correlation relationship) that as the ambient temperature increases, the relative luminous intensity decreases.

Specifically, the white LEDs 17, . . . each have characteristics that the temperature and the luminous intensity are negatively correlated with each other. For example, in each of the white LEDs 17, . . . , as the temperature of the element (ambient atmosphere) increases due to self-heating, the luminous intensity (amount of light) decreases.

To address the above phenomenon, the backlight controller 121 drives and controls each of the white LEDs 17, based on the temperature difference between a temperature setting for the sub-region α(i, j) corresponding to that white LED 17 in the temperature distribution characteristics of the temperature distribution correction table TB1 (see FIG. 10), and the reference temperature.

In the first embodiment, the backlight controller 121 decreases the luminous intensities of any one or more of the white LEDs 17, . . . having the characteristics that the temperature and the luminous intensity are negatively correlated with each other, that have a lower temperature setting than the reference temperature, by an amount corresponding to the temperature difference between the temperature setting and the reference temperature. The reference temperature is a highest temperature setting (specifically, 45° C.) in the temperature distribution characteristics of the temperature distribution correction table TB1.

Specifically, a temperature correction table TB2 in which a highest temperature setting (specifically, 45° C.) is a reference temperature is previously stored in the storage unit 122 (see FIG. 6).

FIG. 12 is a diagram schematically showing a data structure of the temperature correction table TB2 in which a highest temperature setting is a reference temperature.

As shown in FIG. 12, in the temperature correction table TB2, for each temperature setting, a luminous intensity magnification factor (specifically, a current magnification factor for a reference current) is set to have a value which indicates a positive correlation relationship opposite to the negative correlation relationship of FIG. 11 so that the luminous intensity signal for the white LEDs 17, . . . at the highest temperature setting (specifically, 45° C.) is a reference luminous intensity signal (specifically, a reference current of 20 mA).

As used herein, the "positive correlation relationship" refers to a relationship that as the temperature increases, the luminous intensity magnification factor increases, and as the temperature decreases, the luminous intensity magnification factor decreases.

Figure 13:
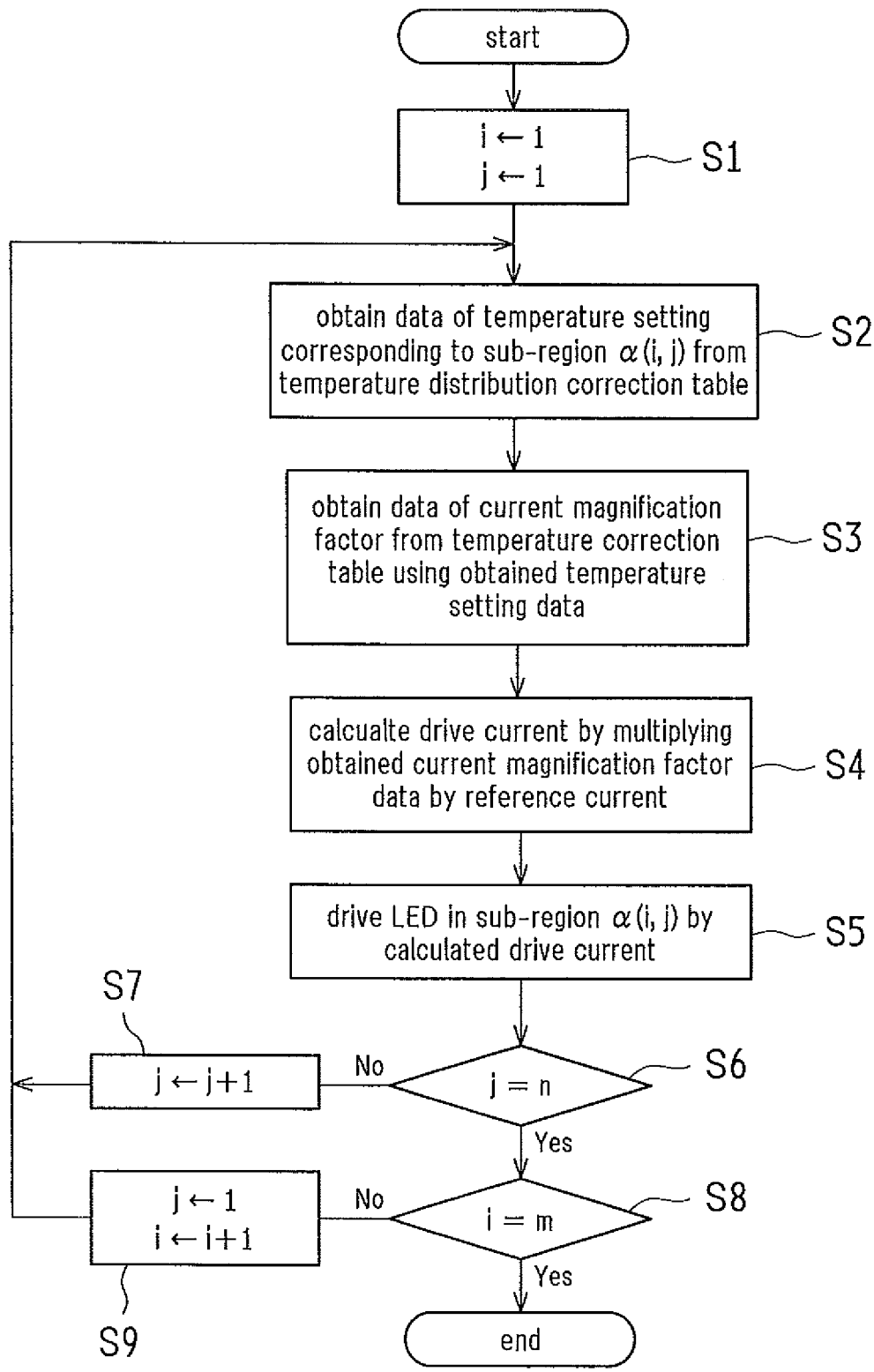
FIG. 13 is a flowchart showing an example luminance control of the white LEDs in the sub-region performed by a backlight controller of the backlight device of the first embodiment.

FIG. 13 is a flowchart showing an example luminance control of the white LEDs 17, . . . in the sub-region α(i, j) performed by the backlight controller 121 of the backlight device 12 of the first embodiment.

As shown in FIG. 13, the backlight controller 121 initially substitutes one into the variables i and j as an initial step (step S1), and thereafter, obtains, as data of a temperature setting, 41° C. corresponding to the sub-region α(i, j) (i=1 and j=1) from the temperature distribution correction table TB1 (see FIG. 10) (step S2), and using the temperature setting data of 41° C. obtained in step S2, obtains, as data of a current magnification factor, 0.969 corresponding to the temperature setting of 41° C. from the temperature correction table TB2 (see FIG. 12) (step S3). Next, the backlight controller 121 multiplies the current magnification factor data (0.969) obtained in step S3 by a reference current (20 mA) to calculate a drive current of 19.38 mA (step S4), and drives the white LEDs 17, . . . in the sub-region α(1, 1) by the calculated drive current (19.38 mA) (step S5).

Similarly, the backlight controller 121 calculates drive currents for the sub-regions α(1, 2) to α(m, n), and drives the white LEDs 17, . . . in the sub-regions α(1, 2) to α(m, n) by the calculated drive currents. Specifically, after step S5, the backlight controller 121 determines whether or not j has reached n (=12) (step S6). If j has not reached n (No in step S6), one is added to j (step S7), and control proceeds to step S2. On the other hand, when j has reached n (YES in stop S6), control proceeds to step S8. In step S8, the backlight controller 121 determines whether or not i has reached m (=16). If i has not reached in (NO in step S8), one is substituted into j and one is added to i (step S9), and control proceeds to step S2. On the other hand, if i has reached in (YES in step S8), the process is ended.

Note that the temperature settings provided in the temperature distribution correction table TB1 and the current magnification factors provided in the temperature correction table TB2 are previously obtained by experimentation or the like. The current magnification factors provided in the temperature correction table TB2 may be obtained from data described in specifications for the LED.

A different temperature correction table TB2 may be stored in the storage unit 122 for each of the white LEDs 17, . . . , and the luminous intensities of the white LEDs 17, . . . may be controlled separately on one-by-one basis. Here, however, the white LEDs 17, . . . are of the same model (i.e., the same configuration and structure), and therefore, a single piece of data is stored. As a result, the luminous intensities of the white LEDs 17, . . . can be efficiently corrected.

If there are a plurality of different types (typically, different models) of white LEDs 17, . . . distinguished from each other in terms of the correlation relationship between the temperature and the luminous intensity, different temperature correction tables TB2 may be provided for different correlation relationships between the temperature and the luminous intensity which correspond to different LED types (typically, models). In this case, the types of the temperature correction tables TB2 and the position information of the white LEDs 17 may be previously stored in association with each other in the storage unit 122.

The same applies to second, third, and fourth embodiments described below.

As described above, according to the first embodiment, the backlight controller 121 obtains current magnification factors from the temperature correction table TB2 based on temperature settings stored in the temperature distribution correction table TB1, obtains drive currents based on the obtained current magnification factors and the reference current (specifically, 20 mA), and drives the white LEDs 17, . . . by the obtained drive currents. Therefore, unlike the conventional art, a temperature detector for detecting the temperature of an LED is not required. Therefore, the luminance of the light emitting surface of the backlight light source 70 can be caused to be uniform irrespective of the non-uniformity of the temperature distribution characteristics of the backlight light source 70, without an increase in the complexity and size of the control configuration.

In the first embodiment, the luminous intensities of the white LEDs 17, . . . corresponding to each of the display sub-regions LC, . . . are controlled based on the lightness or darkness of that display sub-region LC in a display image on the liquid crystal display device 10. Therefore, while the luminance of the light emitting surface of the backlight light source 70 can be caused to be uniform irrespective of the non-uniformity of the temperature distribution characteristics of the backlight light source 70, the luminous intensities of the white LEDs 17, . . . corresponding to each of the display sub-regions LC, . . . can be controlled based on the lightness or darkness of that display sub-region LC. As a result, in the liquid crystal display device 10, a higher contrast and lower power consumption can be stably achieved.

In the first embodiment, the heat dissipation member 18 (18a, 18b) is provided on a portion of the back surface opposite to the light emitting surface of the backlight light source 70. The heat dissipation member 18 (18a, 18b) is made of a metal. The heat dissipation member 18 (18a, 18b) also serves as a supporting frame which supports the backlight light source 70. Therefore, the aforementioned advantages are particularly effective.

In the first embodiment, the backlight controller 121 drives the white LEDs 17, . . . based on the temperature difference between the temperature setting and the reference temperature (specifically, 45° C.). Therefore, the luminance of the light emitting surface of the backlight light source 70 can be caused to be uniform by the simple control configuration.

In the first embodiment, the backlight controller 121 decreases the luminous intensities of any one or more of the white LEDs 17, . . . having the characteristics that the temperature and the luminous intensity are negatively correlated, that have a lower temperature setting than the reference temperature (specifically 45° C.), by an amount corresponding to the temperature difference between the temperature setting and the reference temperature (specifically, 45° C.). Therefore, while the overall power consumption is thereby reduced, the luminance of the light emitting surface of the backlight light source 70 can be caused to be uniform.

In the first embodiment, the highest temperature setting (specifically, 45° C.) in the temperature distribution characteristics of the temperature distribution correction table TB1 is used as the reference temperature. Therefore, for example, this can be effectively applied to the white LED 17 which emits light at a largest luminous intensity during light emission.

In the first embodiment, the backlight controller 121 may increase the luminous intensities of any one or more of the white LEDs 17, . . . having the characteristics that the temperature and the luminous intensity are negatively correlated with each other, that have a higher temperature setting than the reference temperature, by an amount corresponding to the temperature difference between the temperature setting and the reference temperature. The reference temperature may be set to be lower than a highest temperature setting in the temperature distribution characteristics of the temperature distribution correction table TB1.

Here, for example, it is assumed that an intermediate temperature setting (specifically, 39° C.) in the temperature distribution characteristics of the temperature distribution correction table TB1 is used as the reference temperature. The temperature correction table TB2 in which the intermediate temperature setting (specifically, 39° C.) is the reference temperature is previously stored in the storage unit 122.

FIG. 14 is a diagram schematically showing a data structure of the temperature correction table TB2 in which the intermediate temperature setting is the reference temperature.

As shown in FIG. 14, in the temperature correction table TB2, for each temperature setting, a luminous intensity magnification factor (specifically, a current magnification factor for a reference current) is set to have a value which indicates a positive correlation relationship opposite to the negative correlation relationship of FIG. 11 so that the luminous intensity signal of the white LEDs 17, . . . at the intermediate temperature setting (specifically, 39° C.) is a reference luminous intensity signal (specifically, a reference current of 20 mA).

In the backlight device 12 having the above configuration, for example, the backlight controller 121 obtains a temperature setting of 41° C. corresponding to the sub-region α(1, 1) from the temperature distribution correction table TB1 (see FIG. 10) (see step S2 of FIG. 13), and using the obtained temperature setting of 41° C., obtains a current magnification factor of 1.016 corresponding to the temperature setting of 41° C. from the temperature correction table TB2 (see FIG. 14) (see step S3 of FIG. 13). The backlight controller 121 multiplies the obtained current magnification factor (1.016) by the reference current (20 mA) to calculate a drive current of 20.32 mA (see step S4 of FIG. 13), and drives the white LEDs 17, . . . in the sub-region α(1, 1) by the calculated drive current (20.32 mA) (see step S5 of FIG. 13).

Similarly, the backlight controller 121 calculates drive currents for the sub-regions α(1, 2) to α(m, n), and drives the white LEDs 17, . . . in the sub-regions α(1, 2) to α(m, n) by the calculated drive currents.

Thus, the backlight controller 121 increases the luminous intensities of any one or more of the white LEDs 17, . . . having the characteristics that the temperature and the luminous intensity are negatively correlated with each other, that have a higher temperature setting than the reference temperature (specifically, 39° C.), by an amount corresponding to the temperature difference between the temperature setting and the reference temperature (specifically, 39° C.). As a result, while the overall luminance of the light emitting surface of the backlight light source 70 is thereby increased, the luminance of the light emitting surface of the backlight light source 70 can be caused to be uniform.

Note that when the reference temperature is an intermediate temperature setting (specifically, 39° C.), then if the temperature setting is lower than the reference temperature (specifically, 39° C.), as described above the backlight controller 121 decreases the luminous intensity of the white LED 17 having a lower temperature setting than the reference temperature (specifically, 39° C.) by an amount corresponding to the temperature difference between the temperature setting and the reference temperature.

In the first embodiment, the backlight device 12 includes a cooling fan (example cooling device) 19 (see FIG. 15 described below) instead of or in addition to the heat dissipation member 18 (18a, 18b).

Figure 15:
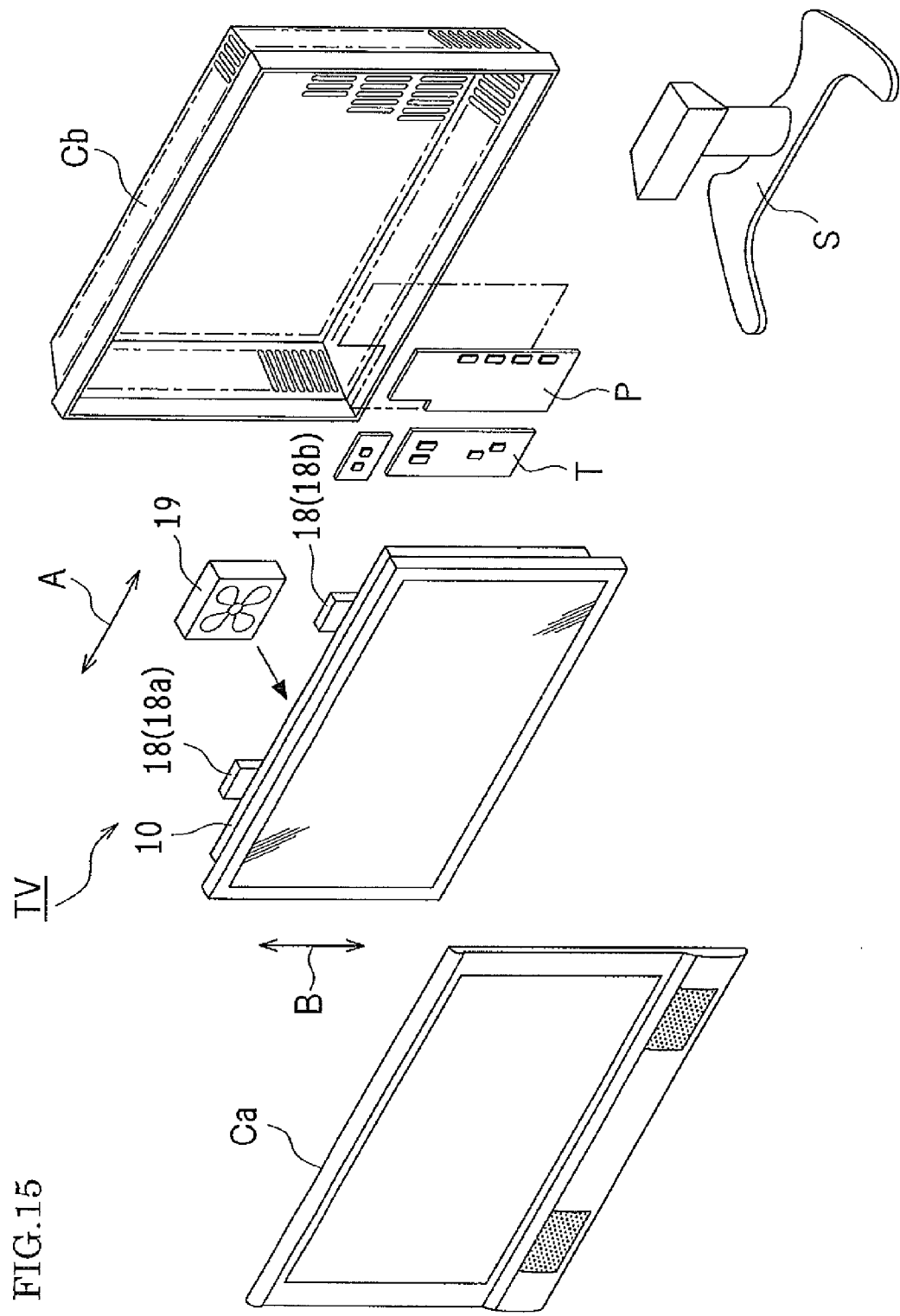
FIG. 15 is an exploded perspective view of the backlight light source in the backlight device of FIG. 1 which is provided with a cooling fan.

FIG. 15 is an exploded perspective view of the backlight light source 70 in the backlight device 12 of FIG. 1 which is provided with the cooling fan 19.

As shown in FIG. 15, the cooling fan 19 is provided on a portion of the back surface opposite to the light emitting surface of the backlight light source 70 (specifically, the back surface of the chassis 14). As a result, the cooling fan 19 can dissipate heat generated by the body of the backlight device 12 from the back surface of the chassis 14.

Specifically, the upper portion of the backlight light source 70 is more likely to have higher temperature (FIGS. 9 and 10), and therefore, the cooling fan 19 is attached to the upper portion at a middle in the row direction A. The cooling fan 19 is provided between the chassis 14 and the rear cabinet Cb of the television receiver TV, and is used to discharge heat generated by the body of the backlight device 12 from the rear cabinet Cb to the outside. Note that, in the first embodiment, the cooling fan 19 has been assumed as a single cooling fan, or alternatively, a plurality of cooling fans may be used.

Second Embodiment

Next, a liquid crystal display device 10A according to a second embodiment will be described hereinafter with reference to FIGS. 16 to 26. Note that, in FIGS. 16 to 26, substantially the same components as those of the first embodiment are indicated by the same reference characters and will not be described.

As described below, the liquid crystal display device 10A of the second embodiment is configured to reduce or eliminate luminance non-uniformity which may occur in the light emitting surface of the backlight light source 70 when the orientation of the backlight device 12 (i.e., the orientation of the liquid crystal display device 10A) is changed.

Figure 16:
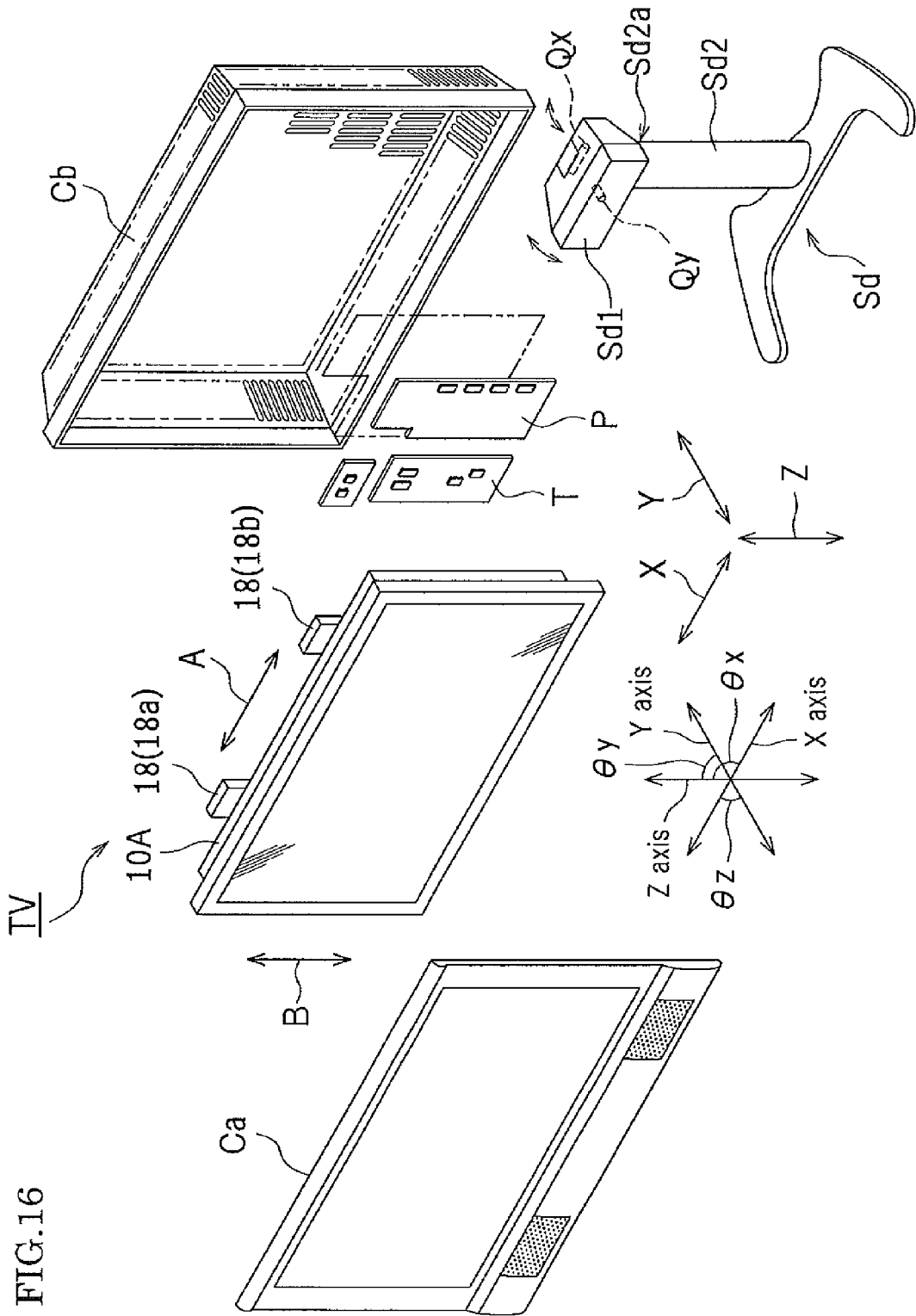
FIG. 16 is an exploded perspective view schematically showing a configuration of a television receiver including a stand which is configured to change the orientation of a liquid crystal display device according to a second embodiment.

FIG. 16 is an exploded perspective view schematically showing a configuration of a television receiver TV including a stand Sd which is configured to change the orientation of the liquid crystal display device 10A of the second embodiment.

As shown in FIG. 16, the stand Sd includes a rotation mechanism Sd1, and a base stand Sd2 which is used to put the liquid crystal display device 10A on a floor via the rotation mechanism Sd1. The rotation mechanism SD1 freely rotates about a first rotation axis Qx extending along a horizontal direction and about a second rotation axis Qy perpendicular to the first rotation axis Qx while supporting the rear cabinet Cb.

FIGS. 17(a) and 17(b) are perspective views schematically showing the rotation mechanism Sd1 which changes the orientation of the liquid crystal display device 10A of the second embodiment. FIG. 17(a) shows that a fixation surface Sd1c to which the rear cabinet Cb is to be fixed extends along both an X-axis direction X and a Z-axis direction Z. FIG. 17(b) shows that the fixation surface Sd1c extends along both the X-axis direction X and a Y-axis direction Y.

As shown in FIGS. 17(a) and 17(b), the rotation mechanism Sd1 includes a first rotation member Sd1a and a second rotation member Sd1b. The first rotation member Sd1a can freely rotate about the first rotation axis Qx with respect to an upper end portion Sd2a of the base stand Sd2. The second rotation member Sd1b can freely rotate about the second rotation axis Qy with respect to the first rotation member Sd1a. Here, the first rotation member Sd1a can be locked at a plurality of predetermined levels (i.e., at predetermined rotation angles) with respect to the upper end portion Sd2a of the base stand Sd2 in a stepwise manner by a first locking mechanism (not shown). The second rotation member Sd1b can be locked at a plurality of predetermined levels (i.e., at predetermined rotation angles) with respect to the first rotation member Sd1a in a stepwise manner by a second locking mechanism (not shown).

Note that the upper end portion Sd2a of the base stand Sd2 may freely rotate about a third rotation axis (not shown) extending along a vertical direction perpendicular to a horizontal direction with respect to a lower end side, and can be locked at a plurality of levels in a stepwise manner.

In the liquid crystal display device 10A of the second embodiment, for example, as in the first embodiment, the backlight device 12 may include a pair of heat dissipation members 18a and 18b, or may further include a middle heat dissipation member 18c (see FIG. 18) in addition to the heat dissipation members 18a and 18b.

Figure 18:
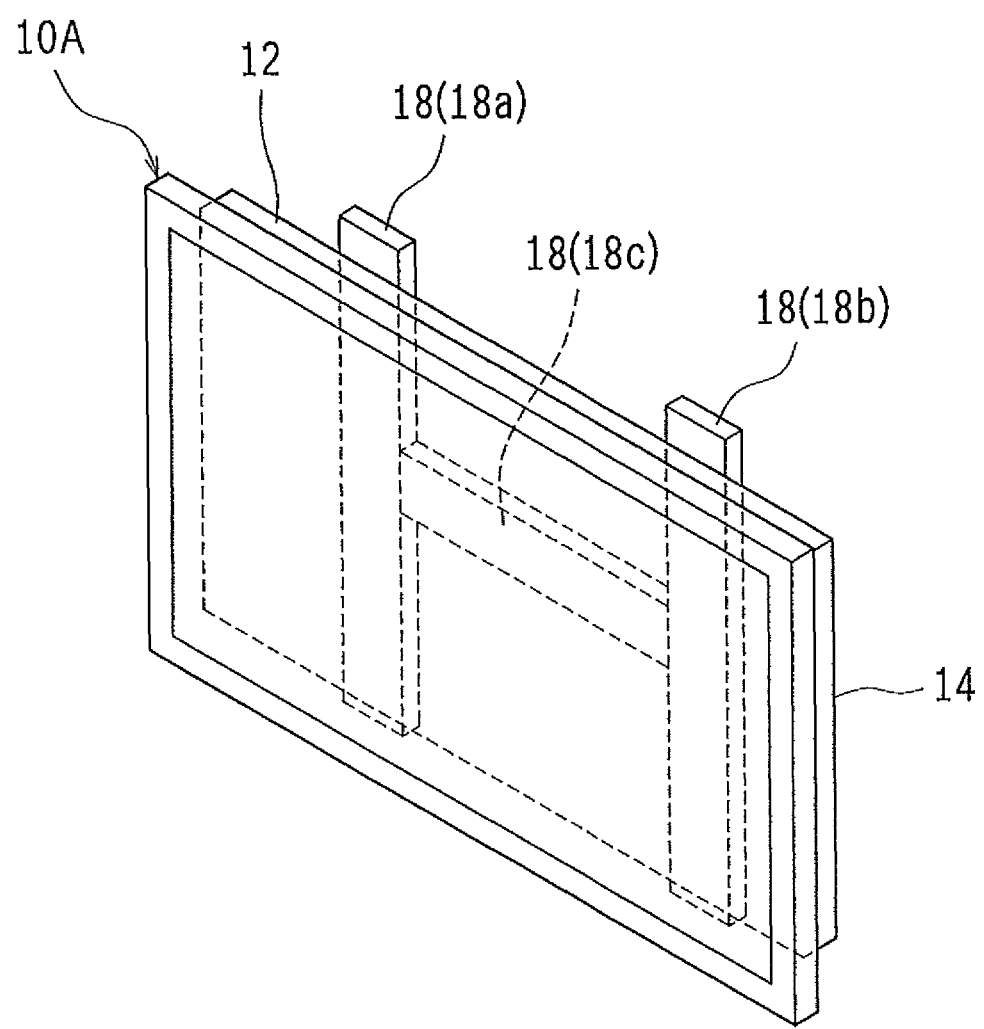
FIG. 18 is a perspective view schematically showing a liquid crystal display device including a backlight device further including a middle heat dissipation member in addition to a pair of heat dissipation members.
Figure 19:
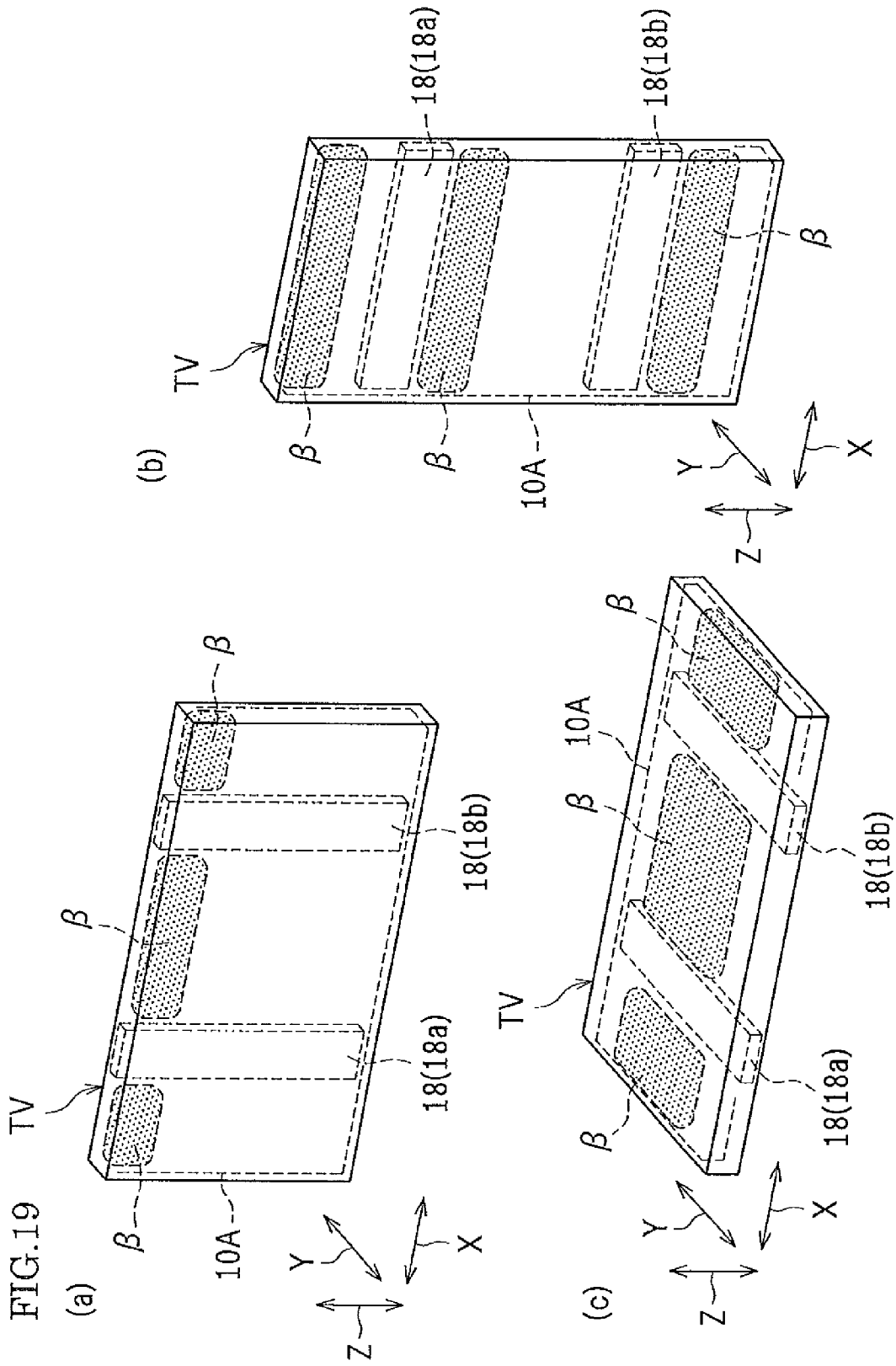
FIG. 19(a) is a perspective view schematically showing portions in which heat is easily retained due to a change in the orientation of a television receiver including a liquid crystal display device including a pair of heat dissipation members, where the liquid crystal display device is in a vertical landscape orientation.
FIG. 19(b) is a perspective view schematically showing portions in which heat is easily retained due to a change in the orientation of the television receiver including the liquid crystal display device including the pair of heat dissipation members, where the liquid crystal display device is in a vertical portrait orientation.
FIG. 19(c) is a perspective view schematically showing portions in which heat is easily retained due to a change in the orientation of the television receiver including the liquid crystal display device including the pair of heat dissipation members, where the liquid crystal display device is in a horizontally lying orientation.
Figure 20:
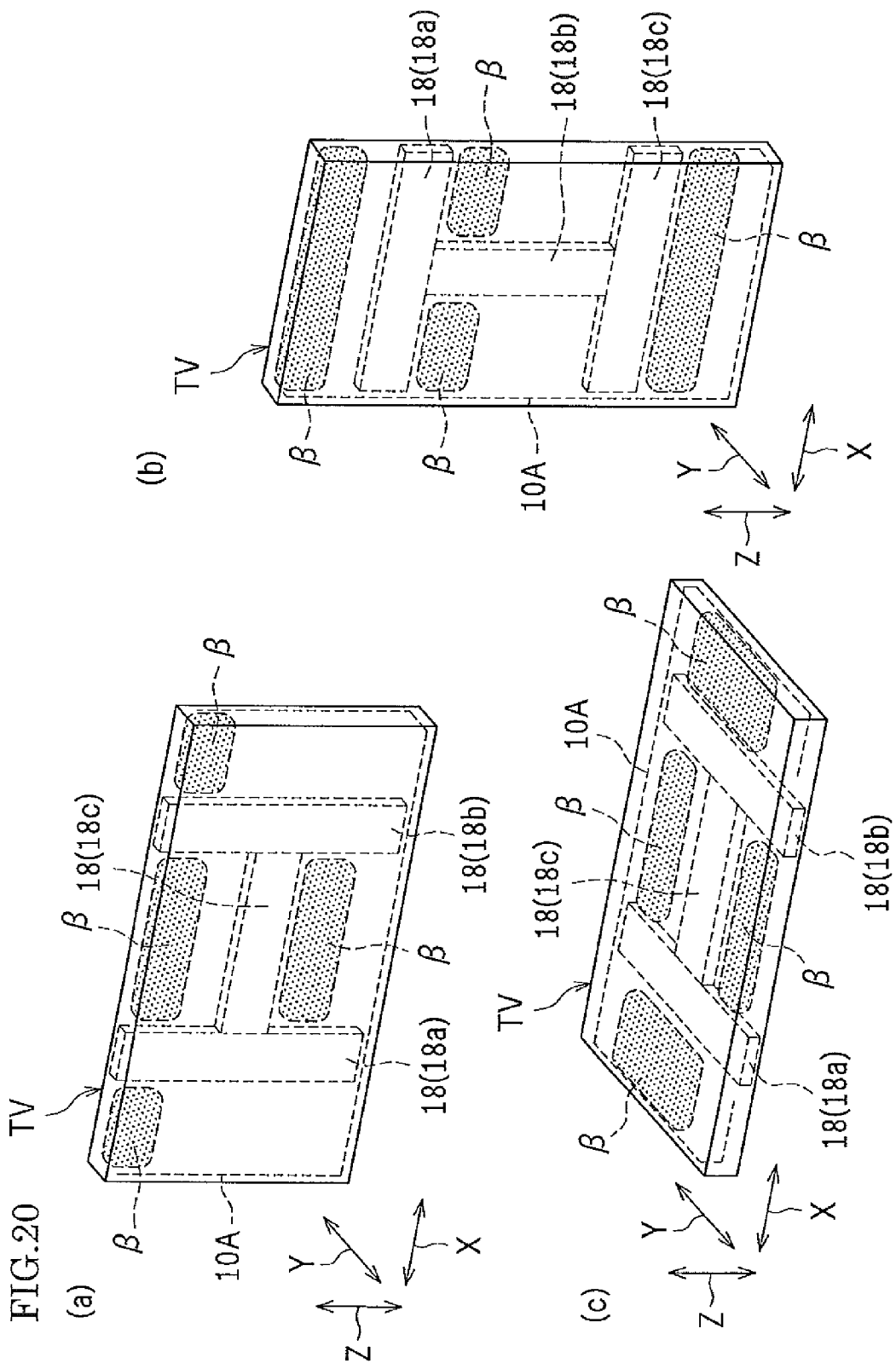
FIG. 20(a) is a perspective view schematically showing portions in which heat is easily retained due to a change in the orientation of a television receiver including a liquid crystal display device including a middle heat dissipation member in addition to a pair of heat dissipation members, where the liquid crystal display device is in a vertical landscape orientation.
FIG. 20(b) is a perspective view schematically showing portions in which heat is easily retained due to a change in the orientation of the television receiver including the liquid crystal display device including the middle heat dissipation member in addition to the pair of heat dissipation members, where the liquid crystal display device is in a vertical portrait orientation.
FIG. 20(c) is a perspective view schematically showing portions in which heat is easily retained due to a change in the orientation of the television receiver including the liquid crystal display device including the middle heat dissipation member in addition to the pair of heat dissipation members, where the liquid crystal display device is in a horizontally lying orientation.

FIG. 18 is a perspective view schematically showing the liquid crystal display device 10A including the backlight device 12 further including the middle heat dissipation member 18c in addition to the pair of heat dissipation members 18a and 18b.

In the backlight device 12 of FIG. 18, the middle heat dissipation member 18c is provided on the chassis 14 between the pair of heat dissipation members 18a and 18b so that the middle heat dissipation member 18c links the pair of heat dissipation members 18a and 18b together. The middle heat dissipation member 18c links the pair of heat dissipation members 18a and 18b together at a middle portion in a longitudinal direction of the pair of heat dissipation members 18a and 18b along a direction perpendicular or substantially perpendicular to the pair of heat dissipation members 18a and 18b.

Figure 17:
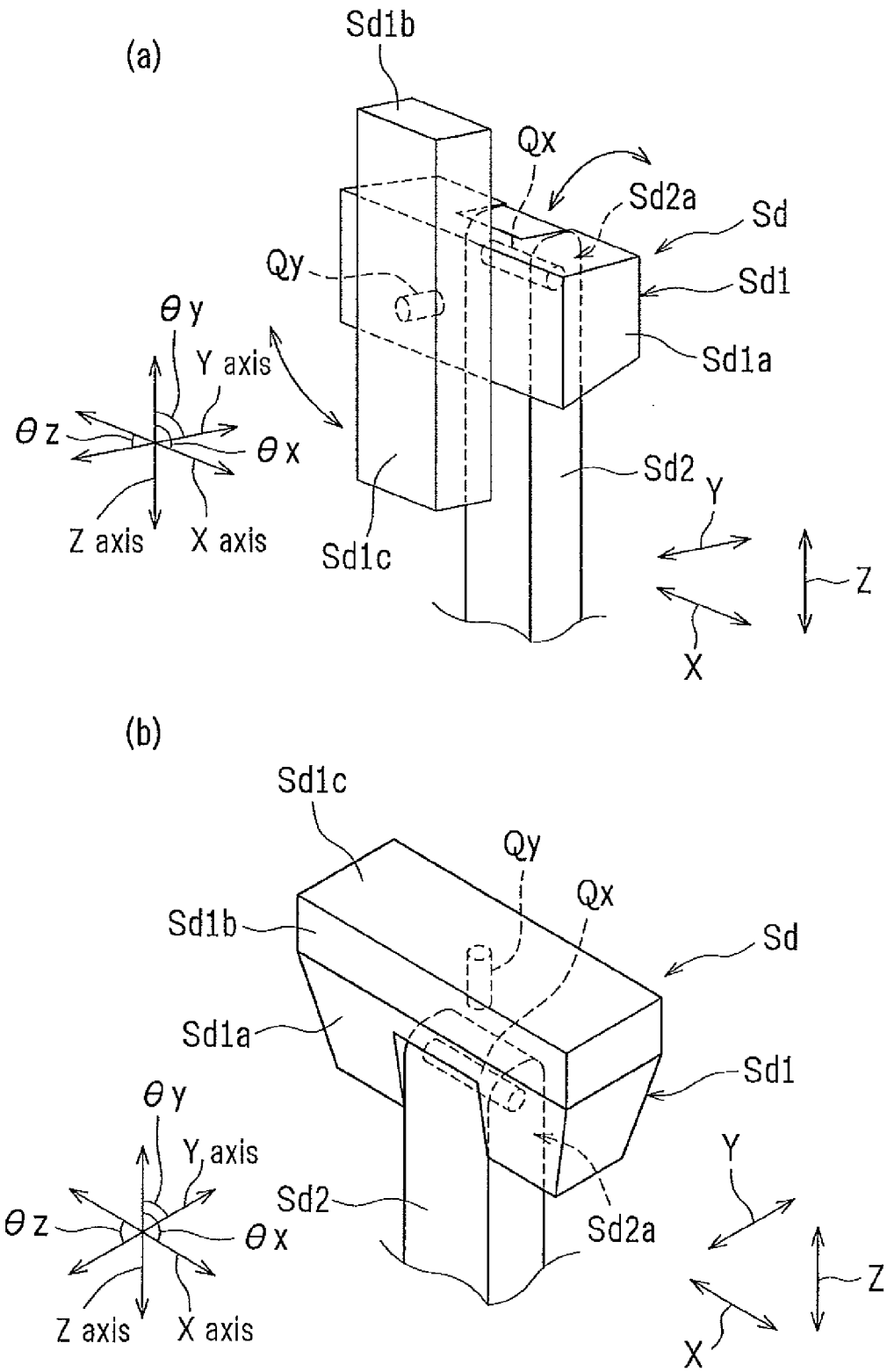
FIG. 17(a) is an exploded perspective view schematically showing a rotation mechanism portion which changes the orientation of the liquid crystal display device of the second embodiment, where a fixation surface on which a rear cabinet is to be fixed extends along both an X-axis direction and a Z-axis direction.
FIG. 17(b) is an exploded perspective view schematically showing the rotation mechanism portion which changes the orientation of the liquid crystal display device of the second embodiment, where the fixation surface extends along both the X-axis direction and a Y-axis direction.

Incidentally, when the orientation of the liquid crystal display device 10A is changed, the temperature distribution characteristics change depending on the states of components of the television receiver TV, such as the arrangements of a component (e.g., the frame 16 (see FIG. 2), the heat dissipation members 18a and 18b, etc.), protruding and recessed portions of an internal structure, and the positions of ventilating openings provided in the front and rear cabinets Ca and Cb (see FIG. 17). As a result, a difference occurs between influences of heat on each of the white LEDs 17, before and after the change of the orientation of the liquid crystal display device 10A. Therefore, due to the change of the orientation of the liquid crystal display device 10A, the emission efficiency varies among the white LEDs 17, . . . , leading to luminance non-uniformity in the light emitting surface of the backlight light source 70.

FIGS. 19(a) to 19(c) are perspective views schematically showing portions β at which heat is easily retained due to the change of the orientation of the television receiver TV including the liquid crystal display device 10A including the pair of heat dissipation members 18a and 18b. FIGS. 20(a) to 20(c) are perspective views schematically showing portions 13 at which heat is easily retained due to the change of the orientation of the television receiver TV including the liquid crystal display device 10A further including the middle heat dissipation member 18c in addition to the pair of heat dissipation members 18a and 18b. FIGS. 19(a) and 20(a) show the liquid crystal display device 10A whose shorter side direction extends along the Z-axis direction Z, i.e, which is in a vertical landscape orientation. FIGS. 19(b) and 20(b) show the liquid crystal display device 10A whose longer side direction extends along the Z-axis direction Z, i.e., which is in a vertical portrait orientation. FIGS. 19(c) and 20(c) show the liquid crystal display device 10A whose thickness direction extends along the Z-axis direction Z, i.e., which is in a horizontally lying orientation.

As shown in FIGS. 19(a) and 20(a), in the liquid crystal display device 10A whose shorter side direction extends along the Z-axis direction Z, i.e, which is in the vertical landscape orientation, heat is easily retained at portions below a top surface along the longer side direction. In addition, in the example of FIG. 20(a), heat is easily retained in a portion below the middle heat dissipation member 18c. As shown in FIGS. 19(b) and 20(b), in the liquid crystal display device 10A whose longer side direction extends along the Z-axis direction Z, i.e., which is in the vertical portrait orientation, heat is easily retained at a portion below a top surface along the shorter side direction and portions below the pair of heat dissipation members 18a and 18b. As shown in FIGS. 19(c) and 20(c), in the liquid crystal display device 10A whose thickness direction extends along the Z-axis direction Z, i.e., which is in the horizontally lying orientation, heat is easily retained in the entire display screen.

In view of this, the liquid crystal display device 10A of the second embodiment further includes an orientation detection unit (an example orientation detector) 30 (see FIG. 21) which detects the orientation of the liquid crystal display device 10A.

For example, the orientation detection unit 30 detects at least a rotational orientation about the first rotation axis Qx and a rotational orientation about the second rotation axis Qy (specifically, a first rotation angle $\theta x$ (see FIGS. 16 and 17(a) and 17(b)) between the X and Z axes of the liquid crystal display device 10A and a second rotation angle $\theta y$ (see FIGS. 16 and 17(a) and 17(b)) between the Y and Z axes of the liquid crystal display device 10A). Here, the orientation detection unit 30 detects the first rotation angle $\theta x$ and the second rotation angle $\theta y$. Note that the orientation detection unit 30 may detect a rotational orientation about a third rotation axis (not shown) extending along the Z-axis direction Z in addition to the rotational orientation about the first rotation axis Qx and the rotational orientation about the second rotation axis Qy (specifically, the orientation detection unit 30 may detect a third rotation angle $\theta z$ (see FIGS. 16 and 17(a) and 17(b)) between the X and Y axes in addition to the first rotation angle $\theta x$ and the second rotation angle $\theta y$).

The orientation detection unit 30 which detects the first rotation angle $\theta x$ and the second rotation angle $\theta y$ may, for example, include a three-dimensional (three-axis) gyroscopic sensor, a three-dimensional (three-axis) gravitational acceleration sensor, or a rotation angle sensor (e.g., a rotary encoder, a potentiometer (variable resistor), etc.).

When the orientation detection unit 30 includes a three-dimensional gyroscopic sensor, the orientation detection unit 30 may further include an angle detection unit (an example angle detector) which detects the first rotation angle $\theta x$ and the second rotation angle $\theta y$ by integrating detection data (data of a rotational angular velocity ωx corresponding to the first rotation angle θx and data of a rotational angular velocity ωy corresponding to the second rotation angle θy) from the three-dimensional gyroscopic sensor while detecting the direction of gravity using the gravitational acceleration sensor. When the orientation detection unit 30 includes a three-dimensional gravitational acceleration sensor, the orientation detection unit 30 may further include an angle detection unit (an example angle detector) which detects the first rotation angle θx and the second rotation angle θy based on detection data (data of the first rotation angle θx and data of the second rotation angle θy) from the three-dimensional gravitational acceleration sensor. When the orientation detection unit 30 includes a rotation angle sensor, the orientation detection unit 30 may further include an angle detection unit (an example angle detector) which detects the first rotation angle θx and the second rotation angle θy based on detection data (data of the first rotation angle θx) from the first rotation angle sensor which detects the first rotation angle θx and detection data (data of the second rotation angle θy) from the second rotation angle sensor which detects the second rotation angle θy.

An example in which, in the liquid crystal display device 10A having the configuration of FIGS. 20(a) to 20(c) which includes the middle heat dissipation member 18c in addition to the pair of heat dissipation members 18a and 18b, the orientation detection unit 30 includes a three-dimensional gyroscopic sensor 31 (see FIG. 21), will be described hereinafter.

Figure 21:
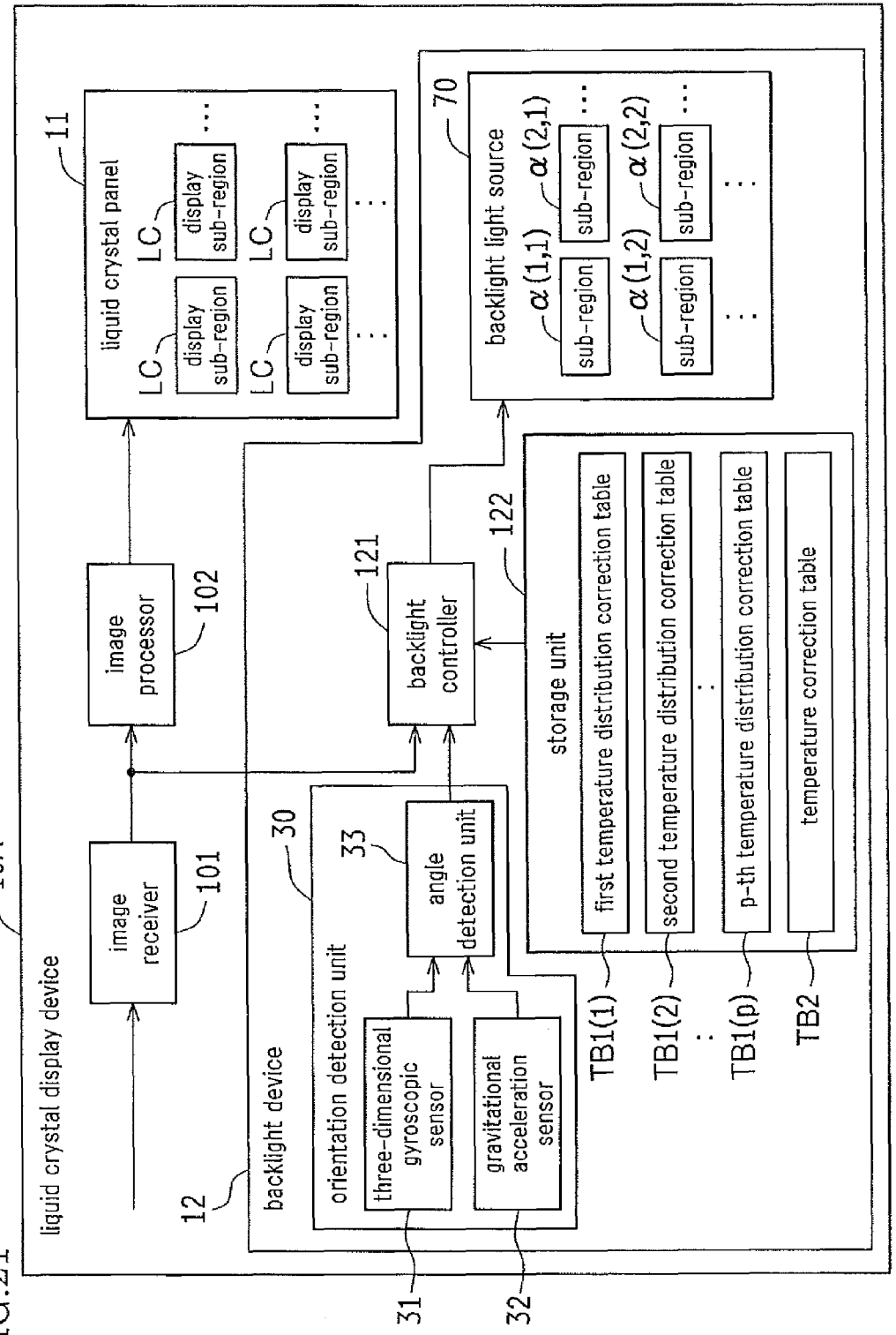
FIG. 21 is a block diagram schematically showing a control configuration of a backlight device in the liquid crystal display device of the second embodiment.

FIG. 21 is a block diagram schematically showing a control configuration of the backlight device 12 in the liquid crystal display device 10A of the second embodiment.

As shown in FIG. 21, the orientation detection unit 30 includes the three-dimensional gyroscopic sensor 31, a gravitational acceleration sensor 32, and an angle detection unit 33. The three-dimensional gyroscopic sensor 31 detects the rotational angular velocity ωx between the X axis and the Z axis (see FIG. 16 and FIGS. 17(a) and 17(b)) and the rotational angular velocity ωy between the Y axis and the Z axis (see FIG. 16 and FIGS. 17(a) and 17(b)). The gravitational acceleration sensor 32 detects the direction of gravity. The angle detection unit 33 detects the first rotation angle θx and the second rotation angle θy by integrating detection data (data of the rotational angular velocity ωx and data of the rotational angular velocity ωy) from the three-dimensional gyroscopic sensor 31 based on the direction of gravity detected by the gravitational acceleration sensor 32.

In the second embodiment, instead of the temperature distribution correction table TB1 of the first embodiment, first to p-th temperature distribution correction tables TB1(1) to TB1(p) are previously stored in a storage unit 122 (see FIG. 21). The first to p-th temperature distribution correction tables TB1(1) to TB1(p) indicate temperature distribution characteristics of the backlight light source 70 corresponding to the sub-regions α(i, j) associated with the white LEDs 17, . . . for p predetermined orientation patterns (p is an integer of two or more, and here, p=3) of the liquid crystal display device 10A, respectively.

Specifically, when the vertical landscape orientation (see FIG. 20(a)) of the liquid crystal display device 10A is defined as a reference orientation) (0°), the orientation detection unit 30 detects the vertical landscape orientation when the first rotation angle θx is 0° or more ±less than 45° and the second rotation angle θy is 0° or more ±less than 45°, the vertical portrait orientation (see FIG. 20(b)) when the first rotation angle θx is ±45° or more ±90° or less and the second rotation angle θy is 0° or more ±less than 45°, and the horizontally lying orientation (see FIG. 20(c)) when the second rotation angle θy is ±45° or more ±90° or less.

The storage unit 122 stores the first temperature distribution correction table TB1(1) corresponding to the vertical landscape orientation of the liquid crystal display device 10A, the second temperature distribution correction table TB1(2) corresponding to the vertical portrait orientation of the liquid crystal display device 10A, and the third temperature distribution correction table TB1(3) corresponding to the horizontally lying orientation of the liquid crystal display device 10A.

FIGS. 22, 23, and 24 are diagrams schematically showing data structures of the first, second, and third temperature distribution correction tables TB1(1), TB1(2), and TB1(3) corresponding to the vertical landscape orientation, vertical portrait orientation, and horizontally lying orientation of the liquid crystal display device 10A, respectively. Note that, in FIGS. 22, 23, and 24, hatched portions indicate portions corresponding to the heat dissipation members 20a, 20b, and 20c, and portions β enclosed by a dashed line indicate portions in which heat is easily retained.

As shown in FIGS. 22, 23, and 24, the first, second, and third temperature distribution correction tables TB1(1), TB1(2), and TB1(3) each provide a temperature setting in each sub-region α(i, j) during temperature saturation of the white LEDs 17, . . . .

The backlight controller 121 (see FIG. 21) selects, based on detection data from the orientation detection unit 30, one (a temperature distribution correction table corresponding to detection data from the orientation detection unit 30) of the first, second, and third temperature distribution correction tables TB1(1) (see FIG. 22), TB1(2) (see FIGS. 23), and TB1(3) (see FIG. 24) set for respective orientations (here, three patterns) of the liquid crystal display device 10A. Based on a difference between a temperature setting in the sub-region α(i, j) corresponding to each of the white LEDs 17, . . . in the temperature distribution characteristics of the selected temperature distribution correction table, and the reference temperature, the backlight controller 121 drives and controls each of the white LEDs 17, . . . .

Figure 25:
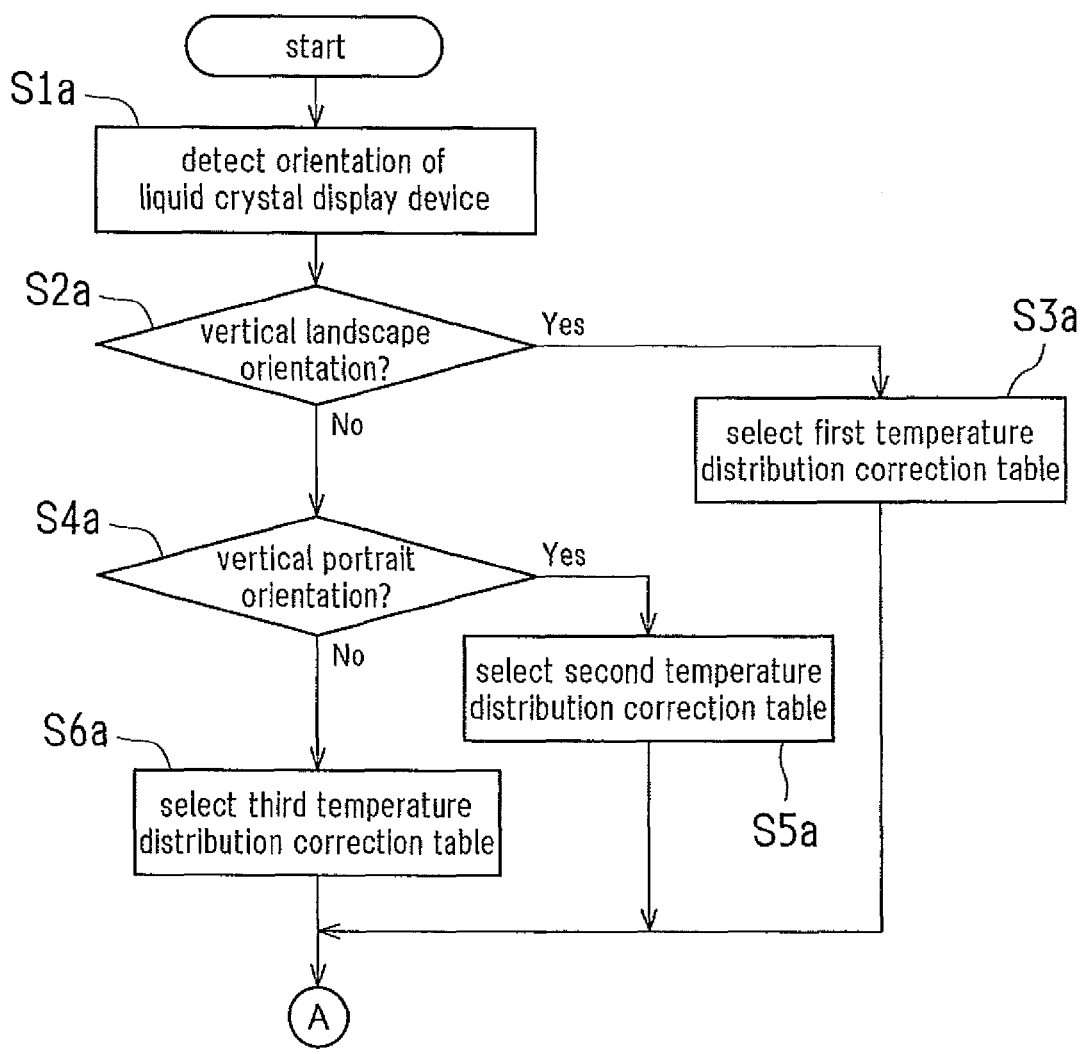
FIG. 25 is a flowchart showing a first half of an example luminance control of white LEDs in sub-regions by a backlight controller of the backlight device of the second embodiment.
Figure 26:
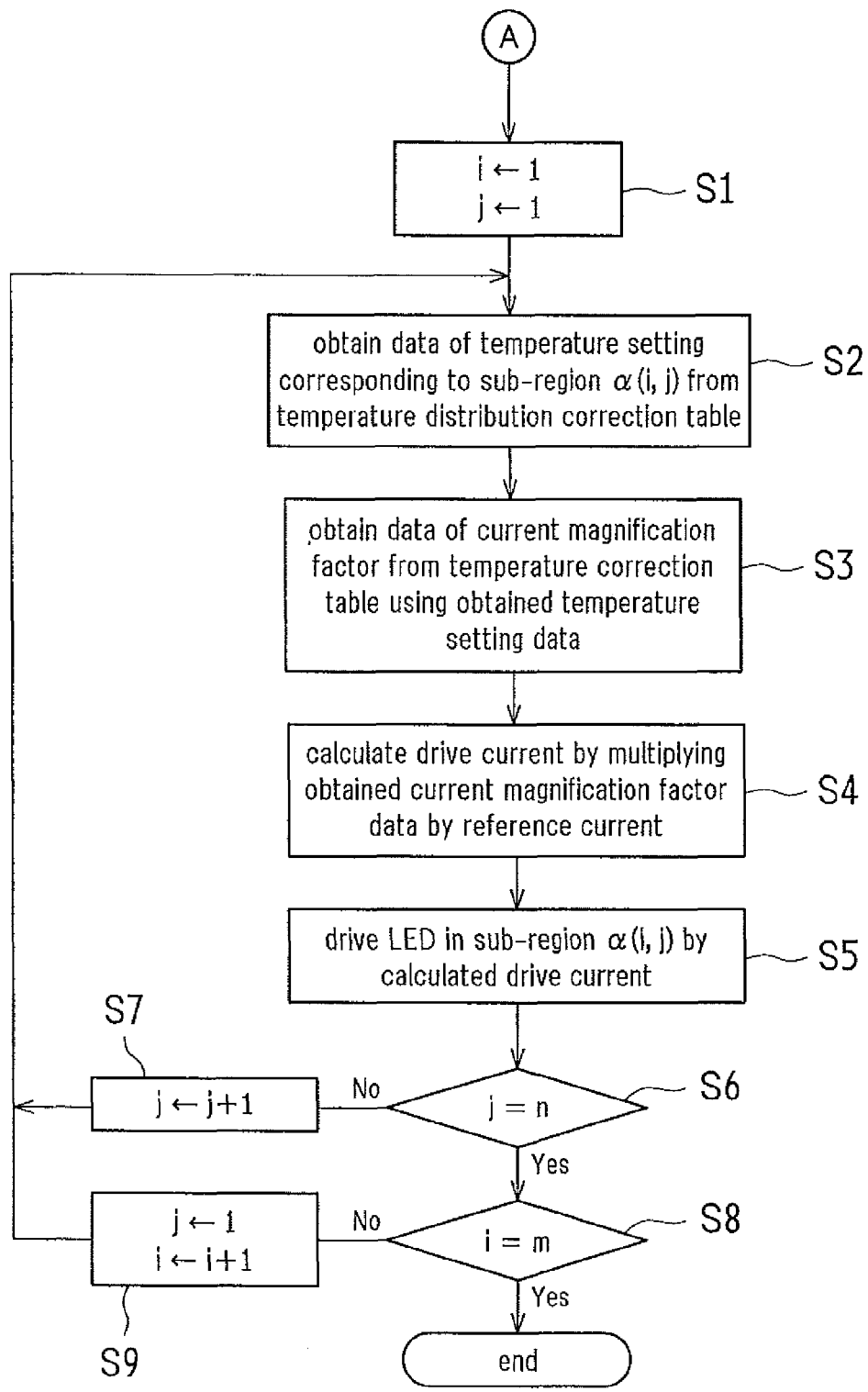
FIG. 26 is a flowchart showing a second half of the example luminance control of white LEDs in sub-regions by the backlight controller of the backlight device of the second embodiment.

FIGS. 25 and 26 are the first and second halves, respectively, of a flowchart showing an example luminance control of the white LEDs 17, . . . in the sub-regions α(i, j) by the backlight controller 121 of the backlight device 12 of the second embodiment.

The flowchart of the second embodiment of FIGS. 25 and 26 is the same as the flowchart of the first embodiment of FIG. 13 (see FIG. 26), except that steps S1a to S6a (see FIG. 25) are provided before step S1. The difference from the flowchart of the first embodiment of FIG. 13 will be mainly described hereinafter.

In the flowchart of the second embodiment of FIG. 25, the backlight controller 121 initially detects the orientation of the liquid crystal display device 10A using the orientation detection unit 30 (step S1a), and if the vertical landscape orientation has been detected (Yes in step S2a), selects the first temperature distribution correction table TB1(1) corresponding to the vertical landscape orientation (step S3a), and proceeds to step S1 of FIG. 26. On the other hand, if the vertical landscape orientation has not been detected in step S2a of FIG. 25 (No in step S2a) and the vertical portrait orientation has been detected (Yes in step S4a), the backlight controller 121 selects the second temperature distribution correction table TB1(2) corresponding to the vertical portrait orientation (step S5a), and proceeds to step S1 of FIG. 26. If the vertical portrait orientation has not been detected in step S4a of FIG. 25 (No in step S4a), the backlight controller 121 selects the third temperature distribution correction table TB1(3) corresponding to the horizontally lying orientation (step S6a), and proceeds to step S1 of FIG. 26.

As described above, according to the second embodiment, in addition to the advantages described in the first embodiment, even when the orientation of the liquid crystal display device 10A is changed, the white LEDs 17, . . . can be caused to have uniform emission efficiency. In the liquid crystal display device 10A, when the orientation of the liquid crystal display device 10A is changed, the temperature distribution characteristics (see FIGS. 19(a) to 19(c) and 20(a) to 20(c)) change depending on the states of components in the television receiver TV, such as the arrangement of a component (e.g., the frame 16, the heat dissipation members 18a and 18b, etc.), protruding and recessed portions of an internal structure, or the positions of ventilating openings provided in the front and rear cabinets Ca and Cb. As a result, a difference occurs between influences of heat on each of the white LEDs 17, . . . before and after the change of the orientation of the liquid crystal display device 10A. In the liquid crystal display device 10A, the backlight controller 121 selects, based on detection data from the orientation detection unit 30, one (a temperature distribution correction table corresponding to the detection data from the orientation detection unit 30) of the first, second, and third temperature distribution correction tables TB1(1) (see FIG. 22), TB1(2) (see FIGS. 23), and TB1(3) (see FIG. 24) set for respective orientations (here, three patterns) of the liquid crystal display device 10A. Based on a difference between a temperature setting in the sub-region $\alpha(i, j)$ corresponding to each of the white LEDs 17, . . . in the temperature distribution characteristics of the selected temperature distribution correction table, and the reference temperature, the backlight controller 121 drives and controls each of the white LEDs 17, . . . . As a result, in the liquid crystal display device 10A of the second embodiment, even when the orientation of the liquid crystal display device 10A is changed, the white LEDs 17, . . . can be caused to have uniform emission efficiency. Therefore, even when the orientation of the liquid crystal display device 10A is changed, the luminance of the light emitting surface of the backlight light source 70 can be caused to be uniform.

Moreover, in the second embodiment, the angle detection unit 33 can be used to detect the first rotation angle $\theta x$ between the X and Z axes of the liquid crystal display device 10A and the second rotation angle $\theta y$ between the Y and Z axes of the liquid crystal display device 10A. As a result, various orientations of the liquid crystal display device 10A can be accurately detected, and therefore, the emission efficiencies of the white LEDs 17, . . . can be controlled in association with various orientations of the liquid crystal display device 10A.

Note that, in the second embodiment, the liquid crystal display device 10A is applied to the television receiver TV in which the liquid crystal display device 10A is put on the stand Sd which can change the orientation of the liquid crystal display device 10A. Alternatively, the liquid crystal display device 10A may be applied to a portable electronic device. Alternatively, the liquid crystal display device 10A may be applied to a display board whose orientation can be changed so that the display screen is tilted (e.g., display boards or handwriting boards, such as an electronic whiteboard, an electronic blackboard, an electronic bulletin board, and the like), and a display board and table in which the orientation of the display device can be changed between a vertical orientation in which the display screen is vertical and a horizontal orientation in which the display screen is horizontal (e.g., a device which can be used as both a handwriting board and a touch table).

Incidentally, in the first and second embodiments, it is assumed that the white LED 17 is a blue LED chip which emits light having a single color (blue) and which is mounted on the substrate 20 and is surrounded and encapsulated with a translucent encapsulation resin containing a red fluorescent material and a green fluorescent material, and therefore, the backlight light source 70 emits white light. Alternatively, by combining light beams having different colors from a plurality of LEDs (specifically, a fluorescent material having an emission peak in a green region is applied to a blue light emitting chip, and the blue chip is used in combination with a red chip, or a red LED, a blue LED, and a green LED are used in combination), a light source which emits light having a predetermined color (specifically, white) may be provided.

Thus, if the backlight light source 70 is a light source which emits light having a predetermined color (specifically, white) by combining light beams having different colors from a plurality of LEDs, the luminous intensity ratio of the different color LEDs having different correlation relationships between the temperature and the luminous intensity varies depending on a change in the temperature, and therefore, the hue of the predetermined color is likely to change. This becomes more significant as the difference in the temperature-vs-luminous intensity correlation relationship between the different color LEDs (specifically, the difference in the factor of proportionality (slope)) increases.

Third and Fourth Embodiments

Next, the liquid crystal display devices 10 and 10A of the first and second embodiments in which backlight devices 12A according to third and fourth embodiments (see FIGS. 27 and 28 described below) which emit white light by using a red LED, a green LED, and a blue LED in combination, is used instead of the backlight device 12, will be described.

The backlight device 12A includes a plurality of LEDs 17R, . . . which emit red light (hereinafter referred to as red LEDs) (see FIG. 29 described below), a plurality of LEDs 17G, . . . which emit green light (hereinafter referred to as green LEDs) (see FIG. 29), and a plurality of LEDs 17B, . . . which emit blue light (hereinafter referred to as blue LEDs) (see FIG. 29), i.e., three color light emitting element groups R, G, and B. Note that, the chassis 14, the red LEDs 17R, . . . , the green LEDs 17G, . . . , and the blue LEDs 17B, . . . , and the LED substrate 20 constitute the backlight light source 70A.

Thus, the red LEDs 17R, . . . , the green LEDs 17G, . . . , and the blue LEDs 17B, . . . in the three color light emitting element groups R, G, and B are light emitting elements which emit red, green, and blue light beams differing between the three color light emitting element groups R, G, and B. Therefore, the backlight light source 70A can emit white light by combining red, green, and blue light beams emitted by the red LEDs 17R, . . . , the green LEDs 17G, . . . , and the blue LEDs 17B, . . . in the three color light emitting element groups R, G, and B.

The red LEDs 17R, . . . , the green LEDs 17G, . . . , and the blue LEDs 17B, . . . are of the same model (i.e., the same configuration and structure).

Figure 27:
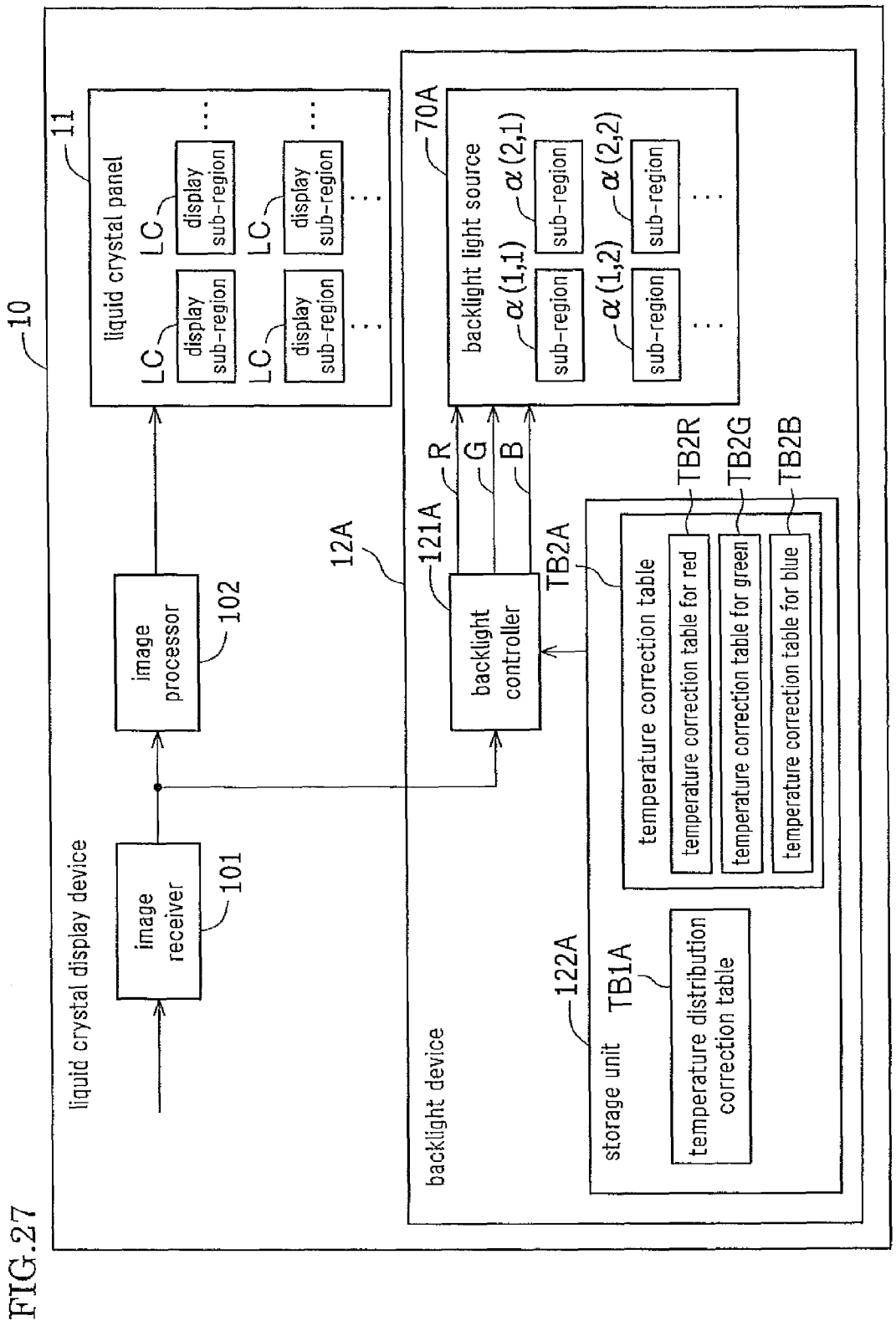
FIG. 27 is a block diagram schematically showing a control configuration for a backlight light source which emits white light by using red LEDs, green LEDs, and blue LEDs in combination in a backlight device according to this embodiment.
Figure 28:
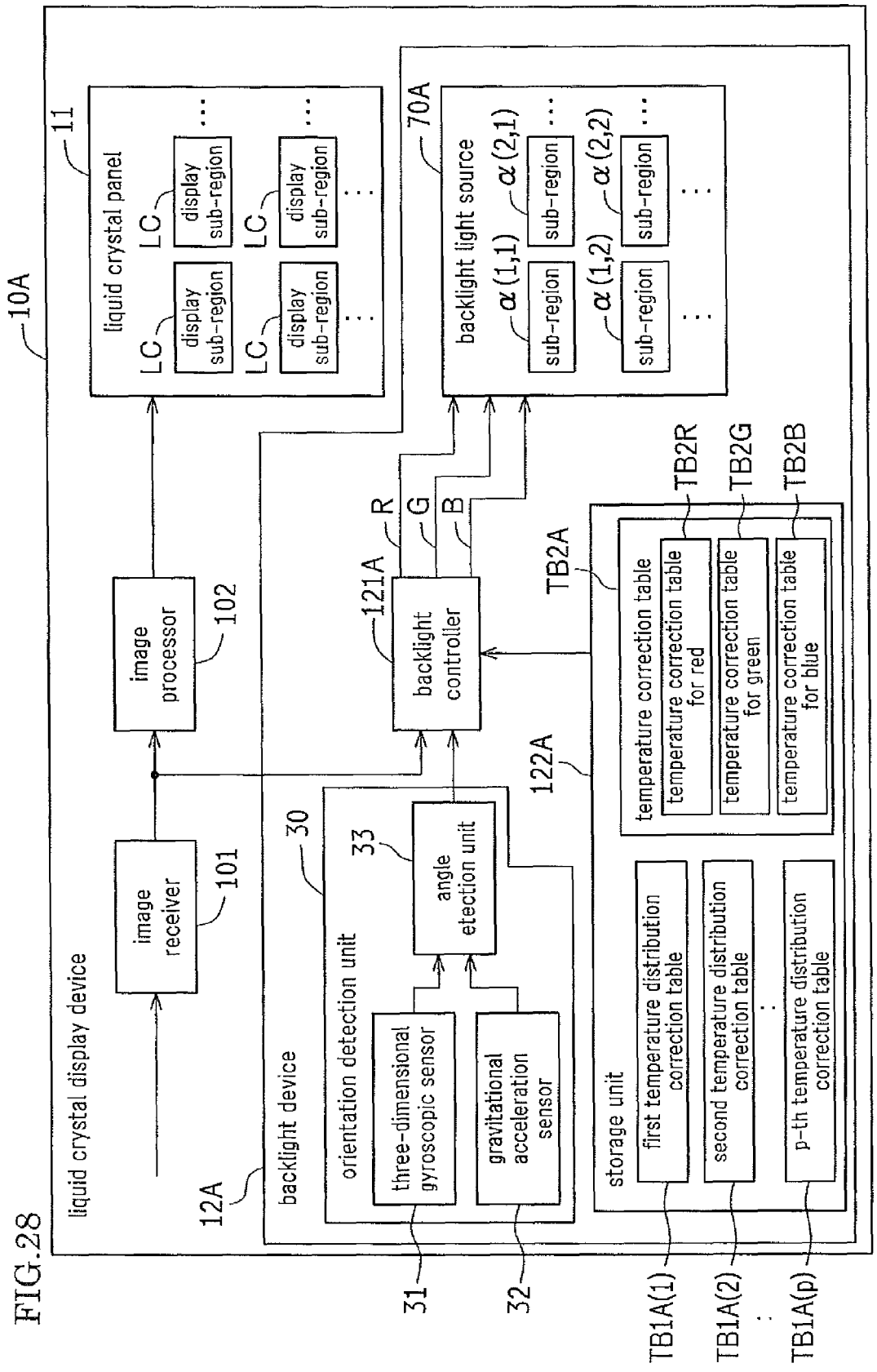
FIG. 28 is a block diagram schematically showing a control configuration of a backlight light source which emits white light by combining a red LED, a green LED, and a blue LED in a backlight device according to a fourth embodiment.

FIGS. 27 and 28 are block diagrams schematically showing a control configuration for the backlight light source 70A which emits white light by using the red LEDs 17R, . . . , the green LEDs 17G, . . . , and the blue LEDs 17B, . . . in combination in the backlight devices 12A of the third and fourth embodiments, respectively.

The control configuration of the backlight devices 12A of FIGS. 27 and 28 will be described, mainly focusing on a difference from the control configuration of the backlight device 12 of FIGS. 6 and 21.

The backlight devices 12A of FIGS. 27 and 28 are the same as the backlight device 12 of FIGS. 6 and 21, except that a backlight controller 121A and a storage unit 122A are provided instead of the backlight controller 121 and the storage unit 122.

The image receiver 101 outputs received image data to the image processor 102 and the backlight controller 121A.

In the third and fourth embodiments, the backlight controller 121A has a function of controlling the luminous intensities of the red LEDs 17R, . . . , the green LEDs 17G, . . . , and the blue LEDs 17B, . . . in the three color light emitting element groups R, G, and B separately in groups of one or more LEDs (here, in groups of a plurality of LEDs).

Specifically, the red LEDs 17R, . . . , the green LEDs 17G, . . . , and the blue LEDs 17B, . . . in the backlight device 12A are each driven and controlled by a luminous intensity signal indicating a luminous intensity (amount of light) input from the backlight controller 121A.

Specifically, the backlight controller 121A includes a dimmer circuit (not shown). The dimmer circuit is used to supply power required to turn on the red LEDs 17R, . . . , the green LEDs 17G, . . . , and the blue LEDs 17B, . . . to drive and control the red LEDs 17R, . . . , the green LEDs 17G, . . . , and the blue LEDs 17B, . . . in the backlight light source 70A in the sub-regions α(i, j) separately (i.e., on a sub-region-by-sub-region basis).

Figure 29:
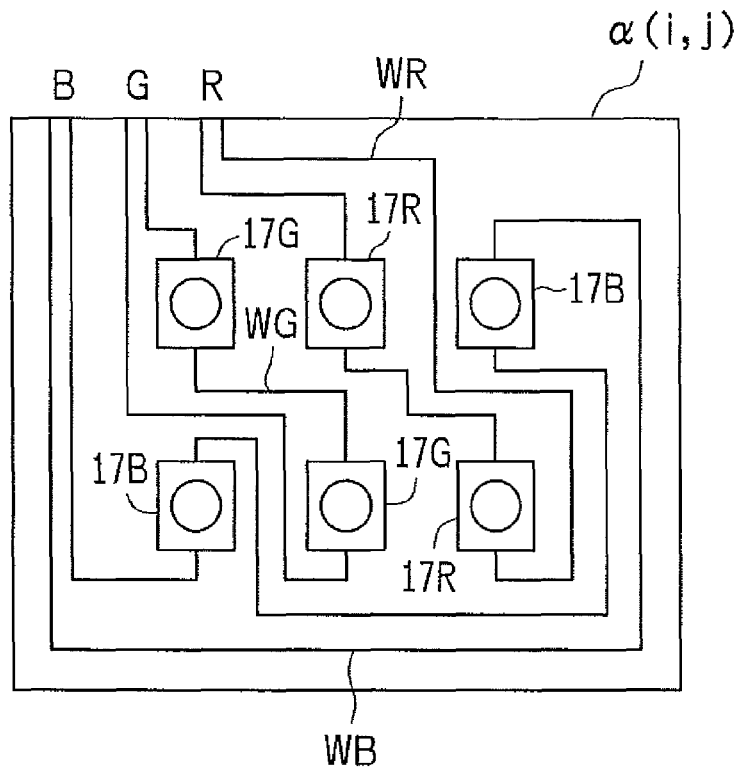
FIG. 29 is a plan view schematically showing one sub-region of FIG. 7, assuming that the red LEDs, the green LEDs, and the blue LEDs are driven and controlled separately in groups of two LEDs.

FIG. 29 is a plan view schematically showing one sub-region α(i, j) of FIG. 7, assuming that the red LEDs 17R, . . . , the green LEDs 17G, . . . , and the blue LEDs 17B, . . . are driven and controlled separately in groups of two LEDs. Note that, in FIG. 29, all the sub-regions α(i, j) have a similar configuration, and therefore, only one sub-region is shown in FIG. 29.

In each sub-region α(i, j), two red LEDs 17R and 17R are connected together in series via an interconnect pattern WR, two green LEDs 17G and 17G are connected together in series via an interconnect pattern WG, and two blue LEDs 17B and 17B are connected together in series via an interconnect pattern WB. As a result, the red LEDs 17R and 17R, the green LEDs 17G and 17G, and the blue LEDs 17B and 17B in each sub-region α(i, j) are controlled by the backlight controller 121A under the same drive conditions (specifically, by the same drive current) in that sub-region α(i, j). Note that the number of LEDs of each color has a value obtained by dividing the number k (specifically, six) of LEDs in each sub-region α(i, j) by the number of colors (specifically, three).

Specifically, the backlight controller 121A turns on the red LEDs 17R, . . . , the green LEDs 17G, . . . , and the blue LEDs 17B, . . . separately under the same drive conditions in each sub-region α(i, j) with luminous intensities based on luminous intensity signals output to the red LEDs 17R, . . . , the green LEDs 17G, . . . , and the blue LEDs 17B, . . . in that sub-region α(i, j). Note that when the luminous intensity signals output to the red LEDs 17R, . . . , the green LEDs 17G, . . . , and the blue LEDs 17B, . . . in each sub-region α(i, j) indicate a luminous intensity of zero, the backlight controller 121A turns off the red LEDs 17R, . . . , the green LEDs 17G, . . . , and the blue LEDs 17B, . . . separately in that sub-region α(i, j).

In the third and fourth embodiments, as position information of the red LEDs 17R, . . . , the green LEDs 17G, . . . , and the blue LEDs 17B, . . . in the backlight light source 70A, the sub-regions α(i, j) are each previously stored in the storage unit 122A in association with the red LEDs 17R, . . . , the green LEDs 17G, . . . , and the blue LEDs 17B, . . . provided in that sub-region α(i, j) (see FIGS. 27 and 28). In the third embodiment, as shown in FIG. 27, a temperature distribution correction table TB1A is previously stored in the storage unit 122A, as a correction table indicating temperature distribution characteristics in the backlight light source 70A corresponding to the sub-regions α(i, j) corresponding to the red LEDs 17R, . . . , the green LEDs 17G, . . . , and the blue LEDs 17B, . . . . In the fourth embodiment, as shown in FIG. 28, first to p-th temperature distribution correction tables TB1A(1) to TB1A(p) are previously stored in the storage unit 122, as correction tables indicating temperature distribution characteristics of the backlight light source 70A corresponding to the sub-regions α(i, j) associated with the red LEDs 17R, . . . , the green LEDs 17G, . . . , and the blue LEDs 17B, . . . for p predetermined orientation patterns (p is an integer of two or more, and here, p=3) of the liquid crystal display device 10A, respectively.

The temperature distribution correction table TB1A and the first to p-th temperature distribution correction tables TB1A(1) to TB1A(p) each provide a temperature setting in each sub-region α(i, j) during temperature saturation of the red LEDs 17R, . . . , the green LEDs 17G, . . . , and the blue LEDs 17B, . . . .

Figure 30:
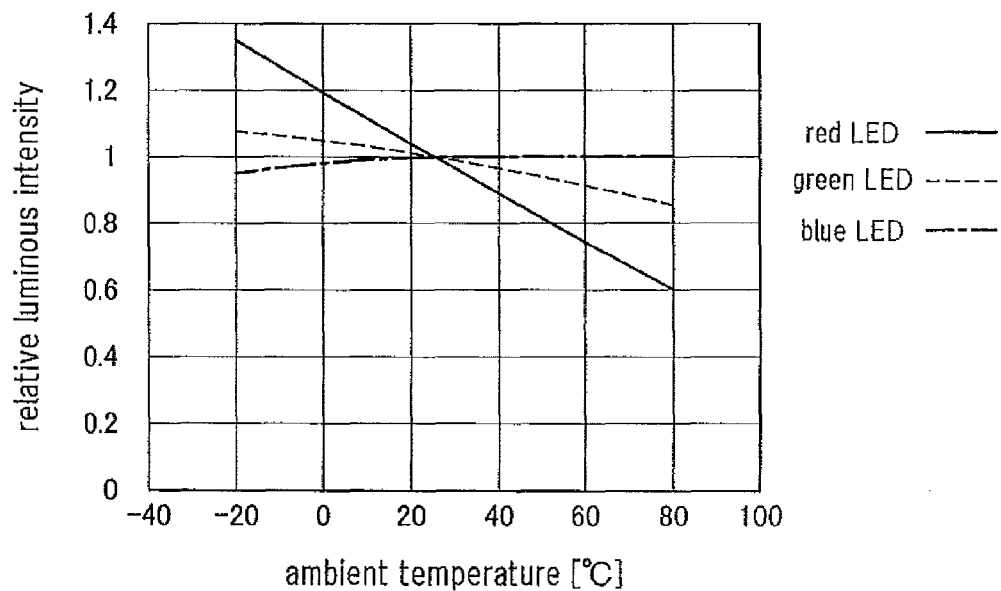
FIG. 30 is a graph showing a relationship between the ambient temperature and relative luminous intensity of each of the red LED, the green LED, and the blue LED provided in the backlight light source.

FIG. 30 is a graph showing a relationship between the ambient temperature and relative luminous intensity of each of the red LED 17R, the green LED 17G, and the blue LED 17B provided in the backlight light source 70A. Note that, in FIG. 30, the vertical axis indicates relative luminous intensities (proportions), where the luminous intensity of each of the red LED 17R, the green LED 17G, and the blue LED 17B has a value of one when that LED is driven based on a predetermined reference luminous intensity signal (here, a reference current (specifically, 20 mA)) and the ambient temperature is 25° C. Note that the reference luminous intensity signal is one that is used as a reference when the sub-regional dimming control is not performed.

Here, as described above, in each of the groups of the red LEDs 17R, . . . , the green LEDs 17G, . . . , and the blue LEDs 17B, . . . in the backlight device 12A, the LEDs are of the same model (i.e., the same configuration and structure), and therefore, have similar same ambient temperature-vs-relative luminous intensity relationships. Therefore, FIG. 30 shows only one of each color LED group that is representative of all LEDs in that color LED group in the backlight device 12A.

As shown in FIG. 30, the red LEDs 17R, . . . and the green LEDs 17G, . . . in the backlight light source 70A have characteristics that as the ambient temperature increases, the relative luminous intensity decreases (negative correlation relationship). On the other hand, the blue LEDs 17B, . . . in the backlight light source 70A have characteristics that as the ambient temperature increases, the relative luminous intensity increases (positive correlation relationship).

Therefore, a temperature correction table TB2A is previously stored in the storage unit 122A (see FIGS. 27 and 28). The temperature correction table TB2A contains a temperature correction table TB2R for red, a temperature correction table TB2G for green, and a temperature correction table TB2B for blue.

In the third and fourth embodiments, in the temperature correction table TB2R for red and the temperature correction table TB2G for green, for each temperature setting, a luminous intensity magnification factor (specifically, a current magnification factor for a reference current) is set to have a value indicating a positive correlation relationship opposite to the negative correlation relationship of the red LED 17R and the green LED 17G of FIG. 30. On the other hand, in the temperature correction table TB2B for blue, for each temperature setting, a luminous intensity magnification factor (specifically, a current magnification factor for a reference current) is set to have a value indicating a negative correlation relationship opposite to the positive correlation relationship of the blue LED 17B of FIG. 30.

As used herein, the "negative correlation relationship" refers to a relationship that as the temperature increases, the luminous intensity magnification factor decreases, and as the temperature decreases, the luminous intensity magnification factor increases.

Note that the temperature correction table TB2R for red, the temperature correction table TB2G for green, and the temperature correction table TB2B for blue may be stored in the storage unit 122A for each of the red LEDs 17R, . . . , each of the greens LED 17G, . . . , and each of the blue LEDs 17B, . . . , respectively, and the luminous intensities of the red LEDs 17R, . . . , the green LEDs 17G, . . . , and the blue LEDs 17B, . . . may be controlled separately on a one-by-one basis. Here, in each of the groups of the red LEDs 17R, . . . , the green LEDs 17G, . . . , and the blue LEDs 17B, . . . , the LEDs are of the same model (i.e., the same configuration and structure). Therefore, each table stores a single piece of data. As a result, the luminous intensities of the red LEDs 17R, . . . , the green LEDs 17G, . . . , and the blue LEDs 17B, . . . can be efficiently corrected.

If at least two of the red LED 17R, the green LED 17G, and the blue LED 17B have the same correlation relationship between the temperature and the luminous intensity, a common temperature correction table can be provided for the at least two LEDs having the same correlation relationship. As a result, the luminous intensities of the red LEDs 17R, . . . , the green LEDs 17G, . . . , and the blue LEDs 17B, . . . can be more efficiently corrected.

The backlight controller 121A performs a luminance control similar to that of FIGS. 13 and 26 on the red LEDs 17R, . . . , the green LEDs 17G, . . . , and the blue LEDs 17B, . . . .

Specifically, the backlight controller 121A obtains current magnification factors from the temperature correction table TB2R for red, the temperature correction table TB2G for green, and the temperature correction table TB2B for blue based on temperature settings stored in one of the temperature distribution correction table TB1A and the first to p-th temperature distribution correction tables TB1A(1) to TB1A(p) (see step S3 of FIGS. 13 and 26), calculates drive currents from the obtained current magnification factors and the reference current (specifically, 20 mA) (see step S4 of FIGS. 13 and 26), and drives the red LEDs 17R, . . . , the green LEDs 17G, . . . , and the blue LEDs 17B, . . . by the respective corresponding calculated drive currents (see step S5 of FIGS. 13 and 26), thereby causing the luminance of the light emitting surface of the backlight light source 70A to be uniform while the hue of a white color is maintained constant.

In the third and fourth embodiments, the backlight controller 121A drives and controls each of the red LEDs 17R, . . . , the green LEDs 17G, . . . , and the blue LEDs 17B, . . . based on the temperature difference between a temperature setting corresponding to a sub-region $\alpha(i, j)$ corresponding to that LED in the temperature distribution characteristics of one of the temperature distribution correction table TB1A and the first to p-th temperature distribution correction tables TB1A(1) to TB1A(p), and the reference temperature. As a result, the luminance of the light emitting surface of the backlight light source 70A can be caused to be uniform by the simple control configuration.

In the third and fourth embodiments, the backlight controller 121A decreases the luminous intensities of any one or more of the red LEDs 17R, . . . and the green LEDs 17G, . . . having the characteristics that the temperature and the luminous intensity are negatively correlated with each other, that have a lower temperature setting than the reference temperature, by an amount corresponding to the temperature difference between the temperature setting and the reference temperature. On the other hand, the backlight controller 121A decreases the luminous intensities of any one or more of the blue LEDs 17B, . . . having the characteristics that the temperature and the luminous intensity are positively correlated with each other, that have a higher temperature setting than the reference temperature, by an amount corresponding to the temperature difference between the temperature setting and the reference temperature. As a result, the luminance of the light emitting surface of the backlight light source 70A can be caused to be uniform while the overall power consumption is reduced.

In the third and fourth embodiments, the highest temperature setting (specifically, 45° C.) in the temperature distribution characteristics of one of the temperature distribution correction table TB1A and the first to p-th temperature distribution correction tables TB1A(1) to TB1A(p) is used as the reference temperature. Therefore, for example, this can be effectively applied to the red LED 17R, the green LED 17G, and the blue LED 17B which emit light at a largest luminous intensity during light emission.

In the third and fourth embodiments, the backlight controller 121A may increase the luminous intensities of any one or more of the red LEDs 17R, . . . and the green LEDs 17G, . . . having the characteristics that the temperature and the luminous intensity are negatively correlated with each other, that have a higher temperature setting than the reference temperature, by an amount corresponding to the temperature difference between the temperature setting and the reference temperature. On the other hand, the backlight controller 121A may increase the luminous intensities of any one or more of the blue LEDs 17B, . . . having the characteristics that the temperature and the luminous intensity are positively correlated with each other, that have a lower temperature setting than the reference temperature, by an amount corresponding to the temperature difference between the temperature setting and the reference temperature. As a result, the luminance of the light emitting surface of the backlight light source 70A can be caused to be uniform while the overall luminance of the light emitting surface of the backlight light source 70A is increased.

In the backlight controllers 121 and 121A of the first, second, third, and fourth embodiments, the luminous intensities of the white LEDs 17, . . . or the red LEDs 17R, . . . , the green LEDs 17G, . . . , and the blue LEDs 17B, . . . are corrected by the sub-regional dimming control. Alternatively, the luminous intensity of each of the white LEDs 17, . . . or each of the red LEDs 17R, . . . , the green LEDs 17G, . . . , and the blue LEDs 17B, . . . may be separately corrected without the sub regional dimming control.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An illumination device comprising:
a light source in which a plurality of light emitting elements are arranged;
a luminous intensity controller configured to control luminous intensities of the plurality of light emitting elements separately in groups of one or more light emitting elements; and
a predetermined correction table indicating temperature distribution characteristics corresponding to position information of the plurality of light emitting elements in the light source, wherein
the luminous intensity controller controls the luminous intensities of the plurality of light emitting elements corresponding to the position information in accordance with the temperature distribution characteristics of the correction table, and
the luminous intensity controller controls the luminous intensities of the plurality of light emitting elements based on temperature differences between temperature settings at positions corresponding to the plurality of light emitting elements in the temperature distribution characteristics of the correction table, and a reference temperature which is used as a reference for a luminous intensity control of controlling the luminous intensity.

2. The illumination device according to claim 1, wherein the luminous intensity controller decreases the luminous intensities of any one or more of the plurality of light emitting elements that have characteristics indicating a negative correlation between the temperature and the luminous intensity and have a lower temperature setting than the reference temperature, by an amount corresponding to the temperature difference.

3. The illumination device according to claim 1, wherein the luminous intensity controller increases the luminous intensities of any one or more of the plurality of light emitting elements that have characteristics indicating a negative correlation between the temperature and the luminous intensity and have a higher temperature setting than the reference temperature, by an amount corresponding to the temperature difference.

4. The illumination device according to claim 2, wherein the reference temperature is a highest temperature setting in the temperature distribution characteristics.

5. The illumination device according to claim 1, further comprising:
a plurality of light emitting element groups each including the plurality of light emitting elements, wherein
the plurality of light emitting elements in the plurality of light emitting element groups emit light having colors that differ among the plurality of light emitting element groups,
the light source emits light having a predetermined color by combining light beams of the plurality of light emitting elements in the plurality of light emitting element groups, and
the luminous intensity controller controls the luminous intensities of the plurality of light emitting elements in each of the plurality of light emitting element groups, separately in groups of one or more light emitting elements.

6. A display device comprising the illumination device according to claim 1.

7. The display device according to claim 6, wherein a display image of the display device is divided into sub-regions, and the luminous intensity controller controls the luminous intensities of any one or more of the plurality of light emitting elements that correspond to each of the sub-regions based on a lightness or darkness of the each of the sub-regions.

* * * * *